(12) United States Patent
Kosugi et al.

(10) Patent No.: US 9,969,874 B2
(45) Date of Patent: May 15, 2018

(54) POLYMER PARTICLE, POLYMER DISPERSION, METHOD FOR PRODUCING SAID POLYMER DISPERSION, COATING MATERIAL PRODUCED FROM SAID POLYMER DISPERSION, AND COATED ARTICLE

(71) Applicants: Mitsubishi Rayon Co., Ltd., Chiyoda-ku (JP); Japan Coating Resin Corporation, Osaka (JP)

(72) Inventors: Naohiro Kosugi, Toyohashi (JP); Shinya Yamato, Toyohashi (JP); Junichi Nakamura, Toyohashi (JP); Motomi Tanaka, Toyohashi (JP); Masashi Torisaki, Osaka (JP)

(73) Assignees: Mitsubishi Chemical Corporation, Tokyo (JP); Japan Coating Resin Corporation, Osaka-shi (JP)

(*) Notice: Subject to any disclaimer, the term of this patent is extended or adjusted under 35 U.S.C. 154(b) by 118 days.

(21) Appl. No.: 14/767,754

(22) PCT Filed: Feb. 14, 2014

(86) PCT No.: PCT/JP2014/053509
§ 371 (c)(1),
(2) Date: Aug. 13, 2015

(87) PCT Pub. No.: WO2014/126209
PCT Pub. Date: Aug. 21, 2014

(65) Prior Publication Data
US 2015/0376390 A1 Dec. 31, 2015

(30) Foreign Application Priority Data

Feb. 14, 2013 (JP) ................................. 2013-026955
Jun. 14, 2013 (JP) ................................. 2013-125844
Feb. 6, 2014 (JP) ................................. 2014-021278

(51) Int. Cl.
| C08F 2/24 | (2006.01) |
| C08F 2/26 | (2006.01) |
| C08F 2/44 | (2006.01) |
| C08F 283/04 | (2006.01) |
| C08G 18/08 | (2006.01) |
| C08G 18/42 | (2006.01) |
| C08G 18/44 | (2006.01) |
| C08L 33/08 | (2006.01) |
| C09D 133/06 | (2006.01) |
(Continued)

(52) U.S. Cl.
CPC ............. *C08L 33/08* (2013.01); *C08F 2/24* (2013.01); *C08F 2/26* (2013.01); *C08F 2/44* (2013.01); *C08F 283/04* (2013.01); *C08G 18/0828* (2013.01); *C08G 18/42* (2013.01); *C08G 18/44* (2013.01); *C09D 133/06* (2013.01); *C09D 133/08* (2013.01); *C09D 175/04* (2013.01); *C08L 2201/56* (2013.01)

(58) Field of Classification Search
CPC .. C08F 2/44; C08F 283/04; C08F 2/24; C08F 2/26; C08G 18/0828; C08G 18/42; C08G 18/44; C08L 33/08; C08L 2201/56; C09D 133/08; C09D 133/06; C09D 175/04
See application file for complete search history.

(56) References Cited

U.S. PATENT DOCUMENTS

| 6,479,153 B1 | 11/2002 | Kato et al. |
| 6,538,059 B1 | 3/2003 | Muller et al. |
| 2011/0236686 A1* | 9/2011 | Kitano ................ B01J 13/18 428/402 |

FOREIGN PATENT DOCUMENTS

| CN | 1270251 A | 10/2000 |
| CN | 1357015 A | 7/2002 |
| CN | 102675553 A | 9/2012 |
(Continued)

OTHER PUBLICATIONS

International Search Report dated May 13, 2014 in PCT/JP2014/053509 filed Feb. 14, 2014.
(Continued)

*Primary Examiner* — Patrick D Niland
(74) *Attorney, Agent, or Firm* — Oblon, McClelland, Maier & Neustadt, L.L.P.

(57) ABSTRACT

The present invention relates to: a polymer particle in which a urethane resin (A1) and an acrylic polymer (B1) are included in a single particle, said polymer particle having a gel fraction of 10% or more as measured using N,N-dimethylformamide (DMF) as a solvent; a polymer particle in which a urethane resin (A2) having a sulfonic acid group and an acrylic polymer (B2) are included in a single particle, said polymer particle having a surface acid value of 0.1 to 19 mgKOH/g as measured by a potentiometric titration method; and a method for producing a polymer dispersion. According to the present invention, it becomes possible to provide: a polymer dispersion which has excellent polymerization stability and can have an excellent coating viscosity property and excellent storage stability when used in a coating material; a method for producing the polymer dispersion; and a polymer particle contained in the polymer dispersion. It also becomes possible to provide: a coating material which enables the formation of a coating film that can have excellent water resistance and solvent resistance even when the drying conditions include a low temperature and a shorter drying time; and a coated material which has the coating material applied thereon.

11 Claims, No Drawings

(51) Int. Cl.
*C09D 133/08* (2006.01)
*C09D 175/04* (2006.01)

(56) References Cited

FOREIGN PATENT DOCUMENTS

| | | |
|---|---|---|
| JP | 4 132724 | 5/1992 |
| JP | 4 222802 | 8/1992 |
| JP | 2000-281705 A | 10/2000 |
| JP | 2000 344810 | 12/2000 |
| JP | 2000-351805 A | 12/2000 |
| JP | 2001-302714 A | 10/2001 |
| JP | 2002-542350 A | 12/2002 |
| JP | 2002 542351 | 12/2002 |
| JP | 2005 120304 | 5/2005 |
| JP | 2006 274096 | 10/2006 |
| JP | 2007 56120 | 3/2007 |
| JP | 2008 88429 | 4/2008 |
| JP | 2009 120663 | 6/2009 |
| JP | 2014-167036 A | 9/2014 |
| WO | 2009 048057 | 4/2009 |
| WO | 2010/041677 A1 | 4/2010 |

OTHER PUBLICATIONS

Office Action dated Jun. 28, 2016 in Japanese Patent Application No. 2013-026955 (with unedited computer generated English translation).

Chinese Office Action and Search Report dated Jun. 7, 2016 in Patent Application No. 201480008766.2 (with English Translation and English Translation of Categories of Cited Documents).

Notification of Reasons for Refusal dated Aug. 1, 2017, in Japanese Patent Application No. 2013-125844 filed Jun. 14, 2013 (with machine-generated English translation).

\* cited by examiner

POLYMER PARTICLE, POLYMER DISPERSION, METHOD FOR PRODUCING SAID POLYMER DISPERSION, COATING MATERIAL PRODUCED FROM SAID POLYMER DISPERSION, AND COATED ARTICLE

TECHNICAL FIELD

The present invention relates to polymer particles, a polymer dispersion, a method for producing the polymer dispersion, a coating material produced from the polymer dispersion, and a coated article.

This application is based upon and claims the benefit of priority of the prior Japanese Patent Application No. 2013-026955 filed in the Japanese Patent Office on Feb. 14, 2013, the prior Japanese Patent Application No. 2013-125844 filed in the Japanese Patent Office on Jun. 14, 2013, and the prior Japanese Patent Application No. 2014-021278 filed in the Japanese Patent Office on Feb. 6, 2014, the entire contents of which are incorporated herein by reference.

BACKGROUND ART

Hitherto, in the field of paints, the conversion from organic solvent-based paints to water-based paints has been attempted from the viewpoint of environmental conservation and safety and health. However, the water-based paints have a problem that the appearance of coating film and the coating film performance such as weather resistance, water resistance, solvent resistance, and contamination resistance are poorer as compared with those of the organic solvent-based paints.

Hence, paints containing an intraparticle mixture of resins having different properties have been proposed in order to solve these problems.

For example, in Patent Documents 1 and 2, a particulate polymer as a mixture of a urethane resin and an acrylic polymer obtained by emulsion polymerization of an acrylic monomer in an aqueous dispersion of the urethane resin is described.

In addition, Patent Document 3 also describes a particulate polymer using a urethane resin and an acrylic polymer.

In addition, it is recently required to dry the paint at a low temperature in a short time in the drying step after coating from the viewpoint of energy saving. Hence, a paint exhibiting water resistance and solvent resistance under such a drying condition is required.

CITATION LIST

Patent Document

Patent Document 1: JP 2006-274096 A
Patent Document 2: JP 2005-120304 A
Patent Document 3: JP 2008-88429 A

SUMMARY OF THE INVENTION

Problem to be Solved by the Invention

However, the dispersion of polymer particles described in Patent Document 1 exhibits insufficient storage stability when being used in a coating material, and the water resistance and solvent resistance of the coating film formed therefrom are also insufficient.

In the method described in Patent Document 2, a monomer having only one radically polymerizable group is used as the acrylic polymer when polymerizing the acrylic polymer in the polyurethane-based polymer dispersion, and thus the acrylic polymer does not have a crosslinked structure. As a result, the coating film obtained from a dispersion containing this polymer exhibits insufficient water resistance and solvent resistance.

In Patent Document 3, the usage of the dispersion of polymer particles obtained in a paint is not described, and the paint viscosity characteristics and storage stability of the coating material or the water resistance of the coating film formed therefrom is insufficient even if this dispersion of polymer particles is used in the coating material.

An object of the invention is to provide a polymer dispersion which exhibits excellent polymerization stability and excellent paint viscosity characteristics and storage stability when being used in a coating material, a method for producing the polymer dispersion, and polymer particles contained in the polymer dispersion.

Furthermore, another object thereof is to provide a coating material which can form a coating film exhibiting excellent water resistance and solvent resistance even under a drying condition of a low temperature and a short time by using the polymer particles of the invention, and a coated article coated with the coating material.

Means for Solving Problem

The invention has the following configuration.

[1] Polymer particles including a urethane resin (A1) and an acrylic polymer (B1) in the same particle, in which a gel fraction of the polymer particles measured using N,N-dimethylformamide (DMF) as a solvent is 10% or more

[2] The polymer particles according to [1], in which the urethane resin (A1) contains a urethane resin (A1-1) having a sulfonic acid group.

[3] The polymer particles according to [1] or [2], in which the acrylic polymer (B1) contains a repeating unit derived from a monomer (b1) having two or more radically polymerizable groups and a proportion of the repeating unit derived from the monomer (b1) having two or more radically polymerizable groups is from 0.01 to 10% by mass with respect to a total mass of the urethane resin (A1) and the acrylic polymer (B1).

[4] The polymer particles according to any one of [1] to [3], in which the acrylic polymer (B1) contains a repeating unit derived from an acid group-containing radically polymerizable monomer (b2-1) and a proportion of the repeating unit derived from the acid group-containing radically polymerizable monomer (b2-1) is from 0.008 to 3.4% by mass with respect to a total mass of the urethane resin (A1) and the acrylic polymer (B1).

[5] A polymer dispersion including the polymer particles according to any one of [1] to [4].

[6] Polymer particles including a urethane resin (A2) having a sulfonic acid group and an acrylic polymer (B2) in the same particle, in which a surface acid value of the polymer particles measured by potentiometric titration is from 0.1 to 19 mg KOH/g.

[7] The polymer particles according to [6], in which the acrylic polymer (B2) contains a repeating unit derived from a monomer (b3) having two or more radically polymerizable groups.

[8] The polymer particles according to [7], in which a proportion of the repeating unit derived from the monomer (b3) having two or more radically polymerizable groups is from 0.05 to 10% by mass with respect to a total mass of the urethane resin (A2) and the acrylic polymer (B2).

[9] The polymer particles according to any one of [6] to [8], in which the acrylic polymer (B2) contains a repeating unit derived from an acid group-containing radically polymerizable monomer (b4-1) and a proportion of the repeating unit derived from the acid group-containing radically polymerizable monomer (b4-1) is from 0.008 to 3.4% by mass with respect to a total mass of the urethane resin (A2) and the acrylic polymer (B2).

[10] A polymer dispersion including the polymer particles according to any one of [6] to [9].

[11] A method for producing a polymer dispersion, the method including:
a step (1) of obtaining a dispersion containing a polymer P obtained by polymerizing a mixture X containing a urethane resin (A3), a monomer (b5) having two or more radically polymerizable groups, and a radically polymerizable monomer (b6) other than the monomer (b5); and
a step (2) of obtaining a dispersion containing a polymer Z by adding a radically polymerizable monomer mixture Y to the dispersion containing the polymer P and conducting polymerization, in which
a content of the urethane resin (A3) in the mixture X at the time of starting the reaction in the step (1) is from 25 to 95% by mass with respect to a total mass of the mixture X.

[12] The method for producing a polymer dispersion according to [11], in which the monomer (b5) having two or more radically polymerizable groups is a radically polymerizable monomer (b5-1) having an allyl group.

[13] The method for producing a polymer dispersion according to [12], in which the radically polymerizable monomer (b5-1) having an allyl group is at least one kind of monomer selected from the group consisting of allyl (meth) acrylate, triallyl isocyanurate, diallyl isophthalate, diallyl terephthalate, diallyl isocyanurate, and diallyl maleate.

[14] The method for producing a polymer dispersion according to [11], in which a content of the monomer (b5) having two or more radically polymerizable groups in the mixture X is from 0.1 to 10% by mass with respect to a total mass of the mixture X.

[15] A polymer dispersion obtained by the producing method according to any one of [11] to [13].

[16] A coating material including the polymer dispersion according to any one of [5], [10], and [15].

[17] A coated article coated with the coating material according to [16].

[18] The coated article according to [17], in which a gloss retention of the coating film after being immersed in solvent naphtha for 30 seconds is 60% or more.

EFFECT OF THE INVENTION

According to the invention, it is possible to provide a polymer dispersion which exhibits excellent polymerization stability and excellent paint viscosity characteristics and storage stability when being used in a coating material, a method for producing the polymer dispersion, and polymer particles contained in the polymer dispersion.

According to the invention, it is possible to further provide a coating material which can form a coating film exhibiting excellent water resistance and solvent resistance even under a drying condition of a low temperature and a short time, and a coated article coated with the coating material.

MODE(S) FOR CARRYING OUT THE INVENTION

Hereinafter, a first embodiment, a second embodiment, and a third embodiment of the invention will be sequentially described in detail.

<First Embodiment: Polymer Particles>

The first embodiment of the invention is polymer particles which contain a urethane resin (A1) and an acrylic polymer (B1) in the same particle and has a gel fraction measured using N,N-dimethylformamide (hereinafter, abbreviated as DMF) as a solvent of 10% or more.

It is possible to form a coating film exhibiting excellent water resistance and especially excellent solvent resistance even under a drying condition of a low temperature and a short time when a polymer dispersion containing the polymer particles having a gel fraction of 10% or more as a coating material.

The gel fraction is preferably 15% or more and 99.5% or less, even more preferably 15% or more and 95% or less, and even more preferably 20% or more and 90% or less. It is possible to improve the film forming property and to form a coating film exhibiting excellent water resistance and solvent resistance by setting the gel fraction to these ranges. Such polymer particles are produced by, for example, a method in which an acrylic monomer mixture (a mixture of radical polymer monomer) to be described later is polymerized in an aqueous dispersion of the urethane resin (A1).

In other words, the polymer particles according to the first embodiment of the invention can be prepared in the form of a polymer dispersion in which polymer particles are dispersed in a dispersion medium.

In addition, water is preferable as the dispersion medium.

Here, the "gel fraction" is an index indicating the degree of crosslinkage and molecular weight of the polymer, and in the polymer particles of the first embodiment of the invention, it is possible to improve the film forming property and to form a coating film exhibiting excellent water resistance and solvent resistance by setting the gel fraction to these ranges.

In the first embodiment of the invention, the gel fraction with respect to DMF can be determined, for example, as follows.

A dispersion of the polymer particles containing the urethane resin (A1) and the acrylic polymer (B1) in the same particle is coated on a polypropylene plate so as to have a film thickness after drying of 200 µm and dried at 23° C. for 24 hours to form a coating film. The coating film thus obtained is peeled off from the polypropylene plate, a sample is cut out therefrom, and the weight of the sample is measured to determine the "weight of the coating film before being immersed in DMF". The weight of the sample is preferably from 0.035 to 0.045 g. Thereafter, the sample is put in 20 ml of DMF and immersed at 23° C. for 24 hours. After immersion, the DMF containing the sample is filtered using a polytetrafluoroethylene resin (PTFE) filter. The filter and the residue are further dried at 105° C. for 3 hours and then cooled, and the "total weight of the coating film (residue after filtration) after being immersed in DMF and the filter". The "weight of the coating film before being immersed in DMF", the "weight of the filter", and the "total weight of the coating film (residue after filtration) after being immersed in DMF and the filter" are substituted into the following Equation (1) to determine the gel fraction.

Gel fraction (%)=("total weight of coating film (residue after filtration) after being immersed in DMF and filter"−"weight of filter")/("weight of coating film before being immersed in DMF")× 100  (1)

(Urethane Resin (A1))

The polymer particles of the first embodiment of the invention contain a urethane resin (A1) in the polymer particles.

The storage stability of the polymer dispersion to be obtained is improved and the solvent resistance of the coating material obtained from the dispersion is improved as the urethane resin (A1) is contained in the polymer particles.

In the invention, the urethane resin refers to a resin obtained by the reaction of a diol and a polyvalent isocyanate compound.

A diol is an organic compound having two hydroxyl groups in one molecule. Specific examples thereof may include a diol having a relatively low molecular weight such as ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, trimethylene glycol, triethylene glycol, tetraethylene glycol, dipropylene glycol, tripropylene glycol, hexanediol, or cyclohexanedimethanol; a polyester diol obtained by poly-condensation of at least one kind of these diols with at least one kind of dicarboxylic acid such as adipic acid, sebacic acid, itaconic acid, anhydrous maleic acid, terephthalic acid, or an isophthalic acid; a polyether diol such as polyethylene glycol, polypropylene glycol, polycaprolactone diol, polytetramethylene ether diol, or polycarbonate diol; polybutadiene diol, hydrogenated polybutadiene diol, and polyacrylic acid ester diol. In the first embodiment of the invention, these diols may be used singly or two or more kinds thereof may be used concurrently at the time of producing the urethane resin (A1).

The polyvalent isocyanate compound refers to an organic compound having at least two isocyanate groups in one molecule, and examples thereof may include an aliphatic polyvalent isocyanate compound, a cycloaliphatic polyvalent isocyanate compound, and an aromatic polyvalent isocyanate compound. Specific examples of the polyvalent isocyanate compound may include dicyclohexylmethane diisocyanate, 1,6-hexamethylene diisocyanate, isophorone diisocyanate, 1,3-cyclohexylene diisocyanate, 1,4-cyclohexylene diisocyanate, 2,4-tolylene diisocyanate, 2,6-tolylene diisocyanate, 4,4'-diphenylmethane diisocyanate, 2,4'-diphenylmethane diisocyanate, and 2,2'-diphenylmethane diisocyanate. In the first embodiment of the invention, these polyvalent isocyanate compounds may be used singly or two or more kinds thereof may be used concurrently at the time of producing the urethane resin (A1). Among them, an aliphatic or cycloaliphatic isocyanate is preferable since the urethane resin (A1) to be obtained is less likely to turn yellow.

In the first embodiment of the invention, as the method for producing the urethane resin (A1), for example, a method in which the diol and isocyanate described above are allowed to react in an ether such as dioxane in the presence of a catalyst such as dibutyltin dilaurate.

In the first embodiment of the invention, the weight average molecular weight of the urethane resin (A1) is preferably 500 or more and more preferably 1,000 or more from the viewpoint of improving the reactivity with the acrylic monomer mixture to be described later. The upper limit is preferably 500,000 or less and more preferably 100,000 or less.

Here, the "weight average molecular weight" means the value that is calculated in terms of polystyrene using gel permeation chromatography.

As described above, the polymer particles according to the first embodiment of the invention can be produced by a method in which an acrylic monomer mixture (a mixture of radical polymer monomers) is polymerized in the aqueous dispersion of the urethane resin (A1), and the like. In addition, as the method to polymerize an acrylic monomer mixture in an aqueous dispersion of the urethane resin (A1), the emulsion polymerization is preferable.

It is possible to stably produce the polymer particles by using an aqueous dispersion of the urethane resin (A1) as the starting material for the production of the polymer particles according to the first embodiment of the invention.

In addition, it is preferable that a carboxyl group and/or a sulfonic acid group are introduced into the urethane resin (A1) from the viewpoint that the dispersibility of the polymer to be obtained in water is favorable. A urethane resin (A1-1) having a sulfonic acid group (hereinafter, referred to as the "urethane resin (A1-1)" in some cases) is more preferable. The polymerization stability at the time of emulsion polymerization of the urethane resin (A1) with the acrylic monomer mixture is favorable particularly in a case in which the acrylic monomer mixture contains an acid group-containing radically polymerizable monomer having an acid group such as a carboxyl group. In addition, the storage stability when being formed into a coating material is favorable, and a coating film exhibiting excellent water resistance and hydrolysis resistance can be formed.

Here, the "acrylic monomer mixture" refers to the monomer component for obtaining the acrylic polymer (B1).

[Urethane Resin (A1-1) Having Sulfonic Acid Group]

As the urethane resin (A1-1) having a sulfonic acid group, it is possible to use those produced by a method in which a polyol such as a diol, a polyvalent isocyanate compound, and a compound having a sulfonic acid group or any salt thereof are allowed to react; a method in which a polyol having a sulfonic acid group and a polyvalent isocyanate compound are allowed to react; and the like.

Examples of the compound having a sulfonic acid group or any salt thereof may include a hydroxy sulfonic acid such as 1,7-dihydroxynaphthalene sulfonic acid; and an amino sulfonic acid such as 2,4-diaminobenzene sulfonic acid, 3,4-diaminobutane sulfonic acid, 3,6-diamino-2-toluene sulfonic acid, and N-(2-aminoethyl)-2-aminoethyl sulfonic acid. These compounds having a sulfonic acid group or any salt thereof may be used singly or two or more kinds thereof may be used concurrently.

Examples of the polyol having a sulfonic acid group may include a polyol containing a sulfonic acid group such as 1,4-butanediol-2-sulfonic acid; a sulfonate-containing polyol such as a sulfonate-containing polyester polyol, a sulfonate-containing polyether polyol, and a sulfonate-containing polycarbonate polyol. These polyol having a sulfonic acid group may be used singly or two or more kinds thereof may be used concurrently.

In the step of producing the polymer particles according to the first embodiment of the invention, the average particle size of the urethane resin (A1) in the aqueous dispersion of the urethane resin (A1) to be used is preferably 1000 nm or less and more preferably 500 nm or less as the average particle size by the cumulant analysis result. When the urethane resin (A1) has such an average particle size, for example, the storage stability of the aqueous dispersion and coating material and the water resistance and solvent resistance of the coating film are further improved. The average particle size is more preferably 10 nm or more from the viewpoint of paint viscosity characteristics and storage stability when being used in the coating material. In other words, in the polymer particles of the first embodiment of the invention, the average particle size of the urethane resin (A1) in the aqueous dispersion of the urethane resin (A1) is preferably from 10 to 1000 nm and more preferably from 10 to 500 nm, The content of the urethane resin (A1) in the aqueous dispersion of the urethane resin (A1) is preferably. 10% by mass or more and more preferably 25% by mass or more with respect to the total mass of the aqueous dispersion of the urethane resin (A1), In addition, the content is preferably 70% by mass or less and more preferably 60% by mass or less. It is possible to adjust the concentration of solid matter in the polymer dispersion obtained by polymerizing an acrylic monomer mixture in the aqueous dispersion of the urethane resin (A1) to the range of from 10 to 80% by mass when the content of the urethane resin (A1) in the aqueous dispersion of the urethane resin (A1) is from 10 to 70% by mass with respect to the total mass of the aqueous dispersion of the urethane resin (A1). When the concentration of solid matter in the polymer dispersion is within the above range, the coating property is favorable in the case of using this as a coating material. Incidentally, in the present specification, the polymer dispersion is one containing polymer particles and a dispersion medium, and the concentration of solid matter in the polymer dispersion means the content (% by mass) of the polymer particles in the polymer dispersion.

[Aqueous Dispersion of Urethane Resin (A1)]

As the aqueous dispersion of the urethane resin (A1) used in the method for producing the polymer particles according to the first embodiment of the invention, it is also possible to use a commercially available aqueous polyurethane dispersion (urethane dispersion: PUD) as it is. Specific examples thereof may include SUPERFLEX 110, SUPERFLEX 150, SUPERFLEX 210, SUPERFLEX 300, SUPERFLEX 420, SUPERFLEX 460, SUPERFLEX 470, SUPERFLEX 500M, SUPERFLEX 620, SUPERFLEX 650, SUPERFLEX 740, SUPERFLEX 820, and SUPERFLEX 840 manufactured by DKS Co., Ltd., Bayhydrol UH 2606, Bayhydrol UH XP 2648, Bayhydrol UH XP 2650, IMPRANIL DLC-F, IMPRANIL DLN, IMPRANIL DLS, and IMPRANIL XP 2611 manufactured by Sumika Bayer Urethane Co., Ltd., HYDRAN HW-301, HW-310, HW-311, HW-312B, HW-333, HW-340, HW-350, HW-375, HW-920, HW-930, HW-940, HW-950, HW-970, AP-10, AP-20, and ECOS3000 manufactured by DIC Corporation, UCOAT UWS-145, PERMARIN UA-150, PERMARIN UA-200, PERMARIN UA-300, PERMARIN UA-310, UCOAT UX-320, PERMARIN UA-368, PERMARIN UA-385, and UCOAT UX-2510 manufactured by Sanyo Chemical Industries, Ltd., NOESTECKER 100C, EVAFANOL HA-107C, EVAFANOL HA-50C, EVAFANOL HA-170, and EVAFANOL HA-560 manufactured by NICCA CHEMICAL CO., LTD., and ADEKA BONTIGHTER UHX-210 and ADEKA BONTIGHTER UHX-280 manufactured by ADEKA CORPORATION.

[Aqueous Dispersion of Urethane Resin (A1-1) Having Sulfonic Acid Group]

In the step of producing the polymer particles according to the first embodiment of the invention, in the case of using an aqueous dispersion of the urethane resin (A1-1) having a sulfonic acid group as the urethane resin (A1), examples of the aqueous dispersion of the urethane resin (A1-1) having a sulfonic acid group may include F-8082D manufactured by DKS Co., Ltd., Bayhydrol UH650, IMPRANIL DLP-R, IMPRANIL DLU, and IMPRANIL LP RSC 3040 manufactured by Sumika Bayer Urethane Co., Ltd., and PERMARIN UXA-3005 manufactured by Sanyo Chemical Industries, Ltd.

(Acrylic Polymer (B1))

The polymer particles in the first embodiment of the invention are particles containing the urethane resin (A1) and the acrylic polymer (B1) described above in the same particle and can be obtained by radical polymerization of an acrylic monomer mixture in the aqueous dispersion of the urethane resin (A1).

The storage stability of the polymer dispersion to be obtained is improved and the water resistance of the coating material obtained from the dispersion is improved as the polymer particles contain the acrylic polymer (B1).

In the method for producing the polymer particles according to the first embodiment of the invention, the acrylic monomer mixture is not particularly limited as long as the effect of the invention is exhibited, but it is preferable to use a monomer having two or more radically polymerizable groups. The gel fraction of the polymer particles to be obtained with respect to DMF increases, the water resistance and solvent resistance of the coating film are further improved, and especially the solvent resistance is excellent as the monomer having two or more radically polymerizable groups is used.

Here, the radically polymerizable group is a group having a radically polymerizable carbon-carbon unsaturated double bond, a radically polymerizable carbon-carbon unsaturated triple bond, a radical ring-opening polymerizable ring, and the like.

In the first embodiment of the invention, the acrylic polymer (B1) contained in the polymer particles is preferably one obtained by polymerizing an acrylic monomer mixture. In addition, it is preferable that the acrylic monomer mixture contains a monomer (b1) having two or more radically polymerizable groups (hereinafter, simply referred to as the "monomer (b1)" in some cases) and a radically polymerizable monomer (b2) (hereinafter, simply referred to as the "monomer (b2)" in some cases) other than the monomer (b1). The ratio of the monomer (b1) to the monomer (b2) in the acrylic monomer mixture is preferably (b1):(b2)=from 0.05:99.95 to 10:90 and more preferably from 0.25:99.75 to 8:92.

[Monomer (b1) Having Two or More Radically Polymerizable Groups]

Examples of the monomer (b1) having two or more radically polymerizable groups may include a diester compound produced from a diol and (meth)acrylic acid such as ethylene glycol di(meth)acrylate, tetraethylene glycol di(meth)acrylate, polyethylene glycol di(meth)acrylate, propylene glycol di(meth)acrylate, polypropylene glycol di(meth)acrylate, 1,3-butylene glycol di(meth)acrylate, 1,6-hexanediol di(meth)acrylate, neopentyl glycol di(meth)acrylate, 2-hydroxy-1,3-di(meth)acryloxypropane, 2,2-bis[4-(acryloxyethoxy)phenyl]propane, 2,2-bis[4-(methacryloxyethoxy)phenyl]propane, 2,2-bis[4-(acryloxypolyethoxy)phenyl]propane, 2,2-bis[4-(methacryloxypolyethoxy)phenyl]propane, 2-hydroxy-1-acryloxy-3-methacryloxypropane, ethylene oxide-modified bisphenol A di(meth)acrylate, propylene oxide-modified bisphenol A di(meth)acrylate, ethylene oxide-modified hydrogenated bisphenol A di(meth)acrylate, propylene oxide-modified hydrogenated bisphenol A di(meth)acrylate, an epoxy (meth)acrylate obtained by adding a hydroxyalkyl (meth)acrylate such as hydroxy (meth)acrylate to diglycidyl ether of bisphenol A, or polyoxyalkylenated bisphenol A di(meth)acrylate; a polyester compound produced from a compound having three or more hydroxyl groups per one molecule and (meth)acrylic acid such as trimethylolpropane tri(meth)acrylate, tetramethylolmethane tri(meth)acrylate, tetramethylolmethane tetra(meth)acrylate, pentaerythritol tri(meth)acrylate, pentaerythritol tetra(meth)acrylate, dipentaerythritol penta(meth)acrylate, or dipentaerythritol hexa(meth)acrylate; allyl (meth)acrylate, divinylbenzene, triallyl isocyanurate, diallyl iso(tere)phthalate, diallyl isocyanurate, diallyl maleate, tris(2-acryloyloxyethylene) isocyanurate, and ε-caprolactone-modified tris(acryloxyethyl) isocyanurate.

Among them, a radically polymerizable monomer having an allyl group such as ethylene glycol di(meth)acrylate, allyl (meth)acrylate, triallyl isocyanurate, diallyl iso(tere)phthalate, diallyl isocyanurate, or diallyl maleate is preferable.

The monomer (b1) may be composed of only one kind or may contain two or more kinds.

In the first embodiment of the invention, it is preferable that the proportion of the monomer (b1) having two or more radically polymerizable groups used, namely the amount thereof introduced is from 0.01 to 10% by mass with respect to the total mass of the urethane resin (A1) and the acrylic monomer mixture. It is preferable that the monomer (b1) having two or more radically polymerizable groups is used at such a proportion since the acrylic polymer (B1) contains a repeating unit derived from the monomer (b1) having two or more radically polymerizable groups and the proportion of the repeating unit derived from the monomer (b1) having two or more radically polymerizable groups can be set to from 0.01 to 10% by mass with respect to the total mass of the urethane resin (A1) and the acrylic polymer (B1).

In other words, in the first embodiment of the invention, it is preferable that the acrylic polymer (B1) contains a repeating unit derived from the monomer (b1) having two or more radically polymerizable groups and the proportion of the repeating unit derived from the monomer (b1) having two or more radically polymerizable groups is from 0.01 to 10% by mass with respect to the total mass of the urethane resin (A1) and the acrylic polymer (B1).

A coating film exhibiting excellent solvent resistance and water resistance is obtained when the proportion of the repeating unit derived from the monomer (b1) is 0.01% by mass or more with respect to the total mass of the urethane resin (A1) and the acrylic polymer (B1). In addition, a coating film exhibiting excellent solvent resistance and water resistance is obtained without decreasing the flexibility, freeze-thaw resistance, and chipping resistance when the proportion is 10% by mass or less.

In addition, the amount of the monomer (b1) having two or more radically polymerizable groups introduced is more preferably from 0.02 to 8% by mass, even more preferably from 0.03 to 6% by mass, and even more preferably from 0.04 to 4.5% by mass with respect to the total mass of the urethane resin (A1) and the acrylic monomer mixture.

[Radically Polymerizable Monomer (b2) Other than Monomer (b1)]

In addition, in the first embodiment of the invention, it is preferable that the acrylic monomer mixture contains a radically polymerizable monomer (b2) other than the monomer (b1).

Examples of the radically polymerizable monomer (b2) other than the monomer (b1) may include an alkyl (meth)acrylate having an alkyl group having from 1 to 22 carbon atoms such as methyl (meth)acrylate, ethyl (meth)acrylate, n-butyl (meth)acrylate, i-butyl (meth)acrylate, t-butyl (meth)acrylate, pentyl (meth)acrylate, hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, or isostearyl (meth)acrylate; a cycloalkyl (meth)acrylate such as cyclohexyl methacrylate, methylcyclohexyl (meth)acrylate, or t-butylcyclohexyl (meth)acrylate; a hydrolyzable silyl group-containing radically polymerizable monomer such as γ-(meth)acryloyloxypropylmethyldimethoxysilane or γ-(meth)acryloyloxypropyltrimethoxysilane; a radically polymerizable carboxylic acid monomer such as acrylic acid or methacrylic acid; a hydroxyl group-containing radically polymerizable monomer such as 2-hydroxyethyl (meth)acrylate, 2-hydroxypropyl (meth)acrylate, 3-hydroxypropyl (meth)acrylate, or 4-hydroxybutyl (meth)acrylate; a hydroxy-terminated type polyalkylene oxide group-containing radically polymerizable monomer such as hydroxy polyethylene oxide mono(meth)acrylate or hydroxy polypropylene oxide mono(meth)acrylate; an alkyl group-terminated type polyalkylene oxide group-containing radically polymerizable monomer such as methoxy polyethylene oxide mono(meth)acrylate; an oxirane group-containing radically polymerizable monomer such as glycidyl (meth)acrylate; a carbonyl group-containing ethylenically unsaturated monomer such as diacetone acrylamide; a (meth)acrylate having a light stabilizing action such as 1,2,2,6,6-pentamethyl-4-piperidyl (meth)acrylate or 2,2,6,6-pentamethyl-4-piperidyl (meth)acrylate; a (meth)acrylate having a ultraviolet absorbing component such as 2-[2'-hydroxy-5'-(meth)acryloyloxyethylphenyl]-2H-benzotriazole; an aminoalkyl (meth)acrylate such as 2-aminoethyl (meth)acrylate; an amide group-containing radically polymerizable monomer such as (meth)acrylamide; a metal-containing radically polymerizable monomer such as zinc di(meth)acrylate; another (meth)acrylic monomer such as (meth)acrylonitrile, benzyl (meth)acrylate, isobornyl (meth)acrylate, or methoxyethyl (meth)acrylate; an aromatic vinylic monomer such as styrene or methyl styrene; a conjugated diene-based monomer such as 1,3-butadiene or isoprene, and a radically polymerizable monomer such as vinyl acetate, vinyl chloride, or ethylene. Only one kind of these may be used singly or two or more kinds thereof may be used concurrently.

Among these, it is preferable to contain methyl acrylate, ethyl acrylate, n-butyl acrylate, i-butyl acrylate, and 2-ethylhexyl acrylate since the flexibility freeze-thaw resistance, and chipping resistance of the coating film are improved. Among these, it is more preferable to contain methyl acrylate, ethyl acrylate, n-butyl acrylate, and i-butyl acrylate from the viewpoint of the impregnating ability into the urethane resin (A1), an improvement in polymerization rate, and a decrease in formation of aggregates during polymerization.

[Acid Group-Containing Radically Polymerizable Monomer (b2-1)]

In the first embodiment of the invention, it is preferable that an acid group-containing radically polymerizable monomer (b2-1) is contained in the mixture of the radically polymerizable monomers to be used for producing the acrylic polymer (B1) in a proper amount from the viewpoint of storage stability of the coating material and the water resistance of the coating film. This is preferable since the acrylic polymer (B1) contains a repeating unit derived from the acid group-containing radically polymerizable monomer (b2-1) in a proper amount.

Examples of the acid group-containing radically polymerizable monomer (b2-1) may include the radically polymerizable monomers containing a carboxyl group among the monomers (b2) described above. These monomers may be used singly or in combination of two or more kinds thereof. Among these, acrylic acid and methacrylic acid are preferable.

In the first embodiment of the invention, it is preferable that the proportion of the acid group-containing radically polymerizable monomer (b2-1) used, namely the amount thereof introduced is from 0.008 to 3.4% by mass with respect to the total mass of the urethane resin (A1) and the acrylic monomer mixture. It is preferable that the acid group-containing radically polymerizable monomer (b2-1) is blended at such a proportion since the acrylic polymer (B1) contains a repeating unit derived from the monomer (b2-1) and the proportion of the repeating unit derived from the acid group-containing radically polymerizable monomer (b2-1) is set to from 0.008 to 3.4% by mass with respect to the total mass of the urethane resin (A1) and the acrylic polymer (B1). In other words, it is preferable that the acrylic polymer (B1) contains a repeating unit derived from the monomer (b2-1) and the proportion of the repeating unit derived from the acid group-containing radically polymerizable monomer (b2-1) is from 0.008 to 3.4% by mass with respect to the total mass of the urethane resin (A1) and the acrylic polymer (B1). In addition, the proportion of the acid group-containing radically polymerizable monomer used is more preferably from 0.03 to 3.2% by mass, even more preferably from 0.1 to 2.5% by mass, and even more preferably from 0.1 to 1.5% by mass.

[Hydroxyl Group-Containing Radically Polymerizable Monomer (b2-2)]

In addition, in the first embodiment of the invention, it is preferable that a hydroxyl group-containing radically polymerizable monomer (b2-2) is contained in the mixture of the radically polymerizable monomers used for producing the acrylic polymer (B1). It is possible to produce the acrylic polymer (B1) containing a hydroxyl group and further to produce the polymer particles having a hydroxyl group when an acrylic monomer mixture containing the hydroxyl group-containing radically polymerizable monomer (b2-2) is used. Such polymer particles having a hydroxyl group possibly undergoes, for example, a cross-linking reaction with a curing agent such as a melamine crosslinking agent or an isocyanate curing agent. Hence, it is possible to improve the water resistance and solvent resistance of the coating film to be obtained by containing a curing agent such as a melamine crosslinking agent or an isocyanate curing agent together with the polymer particles having a hydroxyl group in the coating material. In addition, the polymer particles having a hydroxyl group also exhibits excellent dispersion stability in an aqueous medium and a coating material.

In the first embodiment of the invention, preferable examples of such a hydroxyl group-containing radically polymerizable monomer (b2-2) may include the hydroxyl group-containing radically polymerizable monomers described in the monomer (b2) described above, that is, 2-hydroxyethyl (meth)acrylate, 2-hydroxypropyl (meth)acrylate, 3-hydroxypropyl (meth)acrylate, and 4-hydroxybutyl (meth)acrylate. The hydroxyl group-containing radically polymerizable monomers (b2-2) may be used singly or two or more kinds thereof may be used concurrently.

However, in the case of containing the hydroxyl group-containing radically polymerizable monomer (b2-2), the proportion thereof used is preferably from 0.1 to 10% by mass with respect to the total mass of the urethane resin (A1) and the acrylic monomer mixture from the viewpoint of the stability of the polymer dispersion to be obtained in an aqueous medium and the water resistance and solvent resistance of coating film to be obtained. It is preferable that the hydroxyl group-containing radically polymerizable monomer (b2-2) is blended at such a proportion since the acrylic polymer (B1) contains a repeating unit derived from the hydroxyl group-containing radically polymerizable monomer (b2-2) and the proportion of the repeating unit derived from the hydroxyl group-containing radically polymerizable monomer (b2-2) can be set to from 0.1 to 10% by mass with respect to the total mass of the urethane resin (A1) and the acrylic polymer (B1). The proportion of the monomer (b2-2) used is more preferably from 0.3 to 8% by mass and even more preferably from 0.5 to 5% by mass with respect to the total mass of the urethane resin (A1) and the acrylic polymer.

In the first embodiment of the invention, the blending ratio of the urethane resin (A1) to the acrylic monomer mixture is not particularly limited as long as the effect of the invention is exhibited, but it is preferable to decide the blending ratio such that the mass ratio of the urethane resin (A1) to the acrylic monomer mixture in the polymer particles is within the suitable range to be described later.

In other words, in the first embodiment of the invention, the mass ratio of the urethane resin (A1) to the acrylic monomer mixture is preferably urethane resin (A1)/acrylic monomer mixture=(10 to 90)/(90 to 10), more preferably (15 to 80)/(85 to 20), even more preferably (20 to 70)/(80 to 30), and even more preferably (25 to 60)/(75 to 40). Incidentally, in this case, the total mass of the urethane resin (A1) and the acrylic monomer mixture is set to 100.

It is possible to set the mass ratio of the urethane resin (A1) to the acrylic polymer (B1) in the polymer particles to be obtained to the same proportion as the mass ratio described above by blending the urethane resin (A1) and the acrylic monomer mixture at such a mass ratio.

In other words, the drying property, water resistance and solvent resistance of the coating film are improved without decreasing the compatibility between the urethane resin and the acrylic polymer and the washability of the coating machine when the mass proportion of the urethane resin (A1) is in the range of from 10 to 90% by mass with respect to the total mass of the urethane resin (A1) and the acrylic polymer (B1).

The gel fraction of the polymer particles with respect to DMF increases and the water resistance and solvent resistance of the coating film are improved and especially the solvent resistance is excellent particularly when the mass proportion is in the range of from 25 to 60% by mass.

In other words, in the first embodiment of the invention, it is possible to control the gel fraction of the polymer particles with respect to DMF by the proportion of the urethane resin (A1) with respect to the total mass of the urethane resin (A1) and the acrylic polymer (B1).

In a mode of the polymer particles in the first embodiment of the invention, it is preferable that the polymer particles contain the urethane resin (A1-1) having a sulfonic acid group and the acrylic polymer (B1) containing the repeating unit derived from the acid group-containing radically polymerizable monomer (b2-1) in the same particle and have a surface acid value measured by potentiometric titration of from 0.1 to 19 mg KOH/g.

As the urethane resin (A1) is the urethane resin (A1-1) having a sulfonic acid group and further the acrylic polymer (B1) contains a repeating unit derived from the acid group-containing radically polymerizable monomer (b2-1) having an acid group such as a carboxyl group, the polymerization stability at the time of the emulsion polymerization of the acrylic monomer mixture in the urethane resin is favorable.

In addition, the storage stability when the polymer dispersion containing the polymer particles is formed into a coating material is favorable and a coating film exhibiting excellent water resistance and hydrolysis resistance can be formed.

In addition, the paint viscosity characteristics are easily exerted and the storage stability is excellent when the polymer particles are formed into a coating material when the surface acid value of the polymer particles according to the first embodiment of the invention is 0.1 mg KOH/g or more. The polymerization stability and the water resistance of the coating film do not decrease and the paint viscosity characteristics and storage stability when the polymer particles are formed into a coating material are favorable when the surface acid value is 19 mg KOH/g or less. The surface acid value is more preferably from 0.5 to 17.5 mg KOH/g, even more preferably from 1 to 10 mg KOH/g, and even more preferably from 1 to 7 mg KOH/g.

Here, the surface acid value refers to a value representing the potassium hydroxide in milligrams that is required to neutralize the acidic component present on the surface of the particles contained in 1 g of the polymer.

The potentiometric titration is a method to decide the end point by measuring a change in the potential corresponding to a change in the concentration of the target component in the solution. It is possible to determine the surface acid value of the polymer particles by conducting potentiometric titration using a polymer dispersion having a known concentration and potassium hydroxide as the titrant.

<Second Embodiment: Polymer Particles>

The second embodiment of the invention is polymer particles which contain the urethane resin (A2) having a sulfonic acid group and the acrylic polymer (B2) in the same particle and have a surface acid value measured by the potentiometric titration of from 0.1 to 19 mg KOH/g.

The surface acid value of the polymer particles in the second embodiment of the invention is required to be from 0.1 to 19 mg KOH/g. The surface acid value is preferably from 0.5 to 17.5 mg KOH/g, more preferably from 1 to 10 mg KOH/g, and even more preferably from 1 to 7 mg KOH/g. The paint viscosity characteristics are easily exerted and the storage stability is excellent when the polymer particles are formed into a coating material when the surface acid value of the polymer particles is 0.1 mg KOH/g or more. The polymerization stability and the water resistance of the coating film do not decrease and the paint viscosity characteristics and storage stability when the polymer particles are formed into a coating material are favorable when the surface acid value is 19 mg KOH/g or less.

In addition, it is preferable that the polymer particles according to the second embodiment of the invention are produced by polymerizing an acrylic monomer mixture in an aqueous dispersion of the urethane resin (A2) having a sulfonic acid group (hereinafter, referred to as the "urethane resin (A2)" in some cases). In addition, the polymerization method is preferably emulsion polymerization.

The urethane resin (A2) having a sulfonic acid group exhibits excellent dispersibility in water, and thus it is possible to stably conduct emulsion polymerization of the acrylic monomer mixture in an aqueous dispersion of the urethane resin (A2), as a result, it is possible to stably obtain a dispersion (polymer dispersion) of polymer particles containing the urethane resin (A2) having a sulfonic acid group and the acrylic polymer (B2) in the same particle.

In other words, the polymer particles according to the second embodiment of the invention can be produced in the form of a polymer dispersion in which the polymer particles are dispersed in a dispersion medium.

In addition, water is preferable as the dispersion medium.

In the second embodiment of the invention, particularly in a case in which the acrylic monomer mixture contains an acid group-containing radically polymerizable monomer (b4-1) having an acid group such as a carboxyl group, the polymerization stability at the time of emulsion polymerization is favorable. In addition, the urethane resin (A2) having a sulfonic acid group also exhibits excellent water resistance and thus a coating film exhibiting excellent water resistance can be formed.

(Urethane Resin (A2) Having Sulfonic Acid Group)

The urethane resin (A2) having a sulfonic acid group in the second embodiment of the invention can be produced by a method in which a polyol such as a diol, a polyvalent isocyanate compound, and a compound having a sulfonic acid group or any salt thereof are allowed to react; a method in which a polyol having a sulfonic acid group and a polyvalent isocyanate compound are allowed to react; and the like in the same manner as the method for producing the urethane resin (A1) of the first embodiment of the invention.

As the diol, the polyvalent isocyanate compound, the compound having a sulfonic acid group or any salt thereof, and the polyol having a sulfonic acid group for producing the urethane resin (A2), the same ones as those described in the first embodiment can be exemplified, and the preferred examples thereof are also the same.

In addition, in the case of using an aqueous dispersion of a urethane resin as the urethane resin (A2), it is possible to use the aqueous dispersion of the urethane resin (A1-1) having a sulfonic acid group exemplified in the urethane resin (A1-1) described above.

In the second embodiment of the invention, the average particle size of the urethane resin (A2) in the aqueous dispersion is preferably 1000 nm or less and more preferably 500 nm or less as the average particle size by the cumulant analysis result. When the urethane resin (A2) has such an average particle size, for example, the storage stability of the aqueous dispersion and coating material and the water resistance and solvent resistance of the coating film are further improved. The average particle size is preferably 10 nm or more from the viewpoint of paint viscosity characteristics and storage stability when being used in a coating material. In other words, in the polymer particles of the second embodiment of the invention, the average particle size of the urethane resin (A2) in the aqueous dispersion of the urethane resin (A2) is preferably from 10 to 1000 nm and more preferably, from 10 to 500 nm.

In addition, the average particle size of the urethane resin (A2) in the aqueous dispersion of the urethane resin (A2) refers to the value determined by the same measuring method as in the first embodiment on the basis of the dynamic light scattering method.

In the second embodiment of the invention, the content of the urethane resin (A2) in the aqueous dispersion of the urethane resin (A2) is preferably 10% by mass or more and more preferably 25% by mass or more with respect to the total mass of the aqueous dispersion of the urethane resin (A2). In addition, the content is preferably 70% by mass or less and more preferably 60% by mass or less. It is possible to adjust the concentration of solid matter in the polymer dispersion obtained by polymerizing an acrylic monomer mixture in the aqueous dispersion to the range of from 10 to 80% by mass when the content of the urethane resin (A2) in the aqueous dispersion of the urethane resin (A2) is from 10 to 70% by mass with respect to the total mass of the aqueous dispersion of the urethane resin (A2). When the concentration of solid matter in the polymer dispersion is within the above range, the coating property is favorable in the case of using this as a coating material.

(Acrylic Polymer (B2))

The polymer particles according to the second embodiment of the invention are particles which contain the urethane resin (A2) and the acrylic polymer (B2) in the same particle and can be obtained by radical polymerization of an acrylic monomer mixture in the aqueous dispersion of the urethane resin (A2).

In other words, in the second embodiment of the invention, the acrylic polymer (B2) contained in the polymer particles is one which is obtained by polymerizing an acrylic monomer mixture, and the acrylic monomer mixture may contain a monomer having a radically polymerizable group other than the acrylic monomer.

In the second embodiment of the invention, it is preferable that the acrylic monomer mixture contains a monomer (b3) having two or more radically polymerizable groups and a radically polymerizable monomer (b4) other than the monomer (b3). In addition, the ratio of the monomer (b3) to the monomer (b4) in the acrylic monomer mixture is preferably (b3):(b4)=from 0.05:99.95 to 10:90 and more preferably from 0.25:99.75 to 8:92.

[Monomer (b3) Having Two or More Radically Polymerizable Groups]

As the monomer (b3) having two or more radically polymerizable groups (hereinafter, simply referred to as the "monomer (b3)" in some cases), the same ones as the monomers (b1) described above can be exemplified. Among those, it is preferable to use a radically polymerizable monomer having an allyl group such as allyl (meth)acrylate, triallyl isocyanurate, diallyl iso(tere)phthalate, diallyl isocyanurate, or diallyl maleate. The monomer (b3) may be composed of one kind or may contain two or more kinds.

In the second embodiment of the invention, it is preferable that the proportion of the monomer (b3) having two or more radically polymerizable groups used, namely the amount thereof introduced is from 0.05 to 10% by mass with respect to the total mass of the urethane resin (A2) and the acrylic monomer mixture. The acrylic polymer (B2) contains a repeating unit derived from the monomer (b3) having two or more radically polymerizable groups and the proportion of the repeating unit derived from the monomer (b3) having two or more radically polymerizable groups can be set to from 0.05 to 10% by mass with respect to the total mass of the urethane resin (A2) and the acrylic polymer (B2) when the monomer (b3) having two or more radically polymerizable groups is used at such a proportion. In other words, in the second embodiment of the invention, it is preferable that the acrylic polymer (B2) contains a repeating unit derived from the monomer (b3) having two or more radically polymerizable groups and the proportion of the repeating unit derived from the monomer (b3) having two or more radically polymerizable groups is from 0.05 to 10% by mass with respect to the total mass of the urethane resin (A2) and the acrylic polymer (B2).

A coating film exhibiting excellent solvent resistance and water resistance is obtained when the proportion of the repeating unit derived from the monomer (b3) is 0.05% by mass or more. In addition, a coating film exhibiting excellent solvent resistance and water resistance is obtained without decreasing the flexibility, freeze-thaw resistance, and chipping resistance when the proportion is 10% by mass or less.

In addition, the amount of the monomer (b3) having two or more radically polymerizable groups introduced is more preferably from 0.25 to 8% by mass, even more preferably from 0.5 to 6% by mass, and even more preferably from 1.0 to 4.5% by mass with respect to the total mass of the urethane resin (A2) and the acrylic monomer mixture.

[Radically Polymerizable Monomer (b4) Other than Monomer (b3)]

In the second embodiment of the invention, as the radically polymerizable monomer (b4) (hereinafter, simply referred to as the "monomer (b4)" in some cases) other than the monomer (b3), the same ones as the monomers (b2) described above can be exemplified and the preferred examples thereof are also the same.

[Acid Group-Containing Radically Polymerizable Monomer (b4-1)]

In addition, in the second embodiment of the invention, it is preferable that an acid group-containing radically polymerizable monomer (b4-1) (hereinafter, simply referred to as the "monomer (b4-1)" in some cases) is contained in the mixture of the radically polymerizable monomers to be used for producing the acrylic polymer (32) in a proper amount. This is preferable since the acrylic polymer (B2) becomes one which contains a repeating unit derived from the acid group-containing radically polymerizable monomer (b4-1) in a proper amount.

As the monomer (b4-1), the same ones as the monomers (b2-1) described above can be exemplified, and the preferred examples thereof are also the same. In addition, in the second embodiment of the invention, the amount of the monomer (b4-1) introduced, the proportion thereof with respect to the total mass of the urethane resin (A2) and the acrylic polymer (B2), and the preferred values thereof are also the same as those in the first embodiment of the invention.

In other words, in the second embodiment of the invention, it is preferable that the acrylic polymer (B2) contains a repeating unit derived from the monomer (b4-1) and the proportion of the repeating unit derived from the acid group-containing radically polymerizable monomer (b4-1) is from 0.008 to 3.4% by mass with respect to the total mass of the urethane resin (A2) and the acrylic polymer (B2).

[Hydroxyl Group-Containing Radically Polymerizable Monomer (b4-2)]

In the second embodiment of the invention, it is preferable that a hydroxyl group-containing radically polymerizable monomer (b4-2) (hereinafter, simply referred to as the "monomer (b4-2)" in some cases) is contained in the mixture of the radically polymerizable monomers to be used for producing the acrylic polymer (B2). It is preferable to use an acrylic monomer mixture containing the hydroxyl-containing radically polymerizable monomer (b4-2) since it is possible to produce the acrylic polymer (B2) containing a hydroxyl group and further to produce the polymer particles having a hydroxyl group.

As the monomer (b4-2), the same ones as the monomers (b2-2) in the first embodiment can be exemplified, and the preferred examples thereof are also the same. In addition, the amount of the monomer (b4-2) introduced is also the same as that of the monomer (b2-2) in the first embodiment.

In other words, in the second embodiment of the invention, it is preferable that the acrylic polymer (B2) contains a repeating unit derived from the hydroxyl group-containing radically polymerizable monomer (b4-2) and the proportion of the repeating unit derived from the hydroxyl group-containing radically polymerizable monomer (b4-2) is from 0.1 to 10% by mass with respect to the total mass of the urethane resin (A2) and the acrylic polymer (B2).

In the second embodiment of the invention, the mass ratio of the urethane resin (A2) having a sulfonic acid group to the acrylic monomer mixture is preferably urethane resin (A2) having a sulfonic acid group/acrylic monomer mixture=(10 to 90)/(90 to 10), more preferably (15 to 85)/(85 to 15), even more preferably (20 to 80)/(80 to 20), and even more preferably (30 to 70)/(70 to 30). Incidentally, in this case, the total mass of the urethane resin (A2) and the acrylic monomer mixture is set to 100.

It is possible to set the mass ratio of the urethane resin (A2) to the acrylic polymer (B2) in the polymer particles to be obtained to the same proportion as the mass ratio described above by blending the urethane resin (A2) and the acrylic monomer mixture at such a mass ratio in the same manner as in the first embodiment.

In other words, in the second embodiment of the invention, the drying property and solvent resistance of the coating film are improved without decreasing the water resistance, resistance to water absorption, and hydrolysis resistance of the coating film, resin compatibility, and the washability of the coating machine when the mass proportion of the urethane resin (A2) having a sulfonic acid group is in the range of from 10 to 90% by mass with respect to the total mass described above.

<Method for Producing Polymer Dispersion>

The polymer particles according to the first embodiment and the second embodiment of the invention, namely the polymer particles containing a urethane resin and an acrylic polymer in the same particle can be obtained as the intended polymer particles in the form of a dispersion (polymer dispersion) in which the polymer particles dispersed in an aqueous medium by a producing method in which an acrylic monomer mixture is polymerized in an aqueous dispersion of a urethane resin.

In the first embodiment and the second embodiment of the invention, as the polymerization method of the acrylic monomer mixture in the urethane resin, for example, a known polymerization method such as a suspension polymerization method or an emulsion polymerization method can be employed. In particular, it is desirable to obtain a polymer dispersion in an emulsion form by an emulsion polymerization method from the viewpoint of various physical properties such as the storage stability of the coating material containing the polymer dispersion to be obtained and the water resistance and solvent resistance of the coating film.

For emulsion polymerization, for example, it is possible to employ a known method in which an acrylic monomer mixture is supplied into the polymerization system in the presence of a surfactant and the polymerization thereof is conducted by a radical polymerization initiator.

The polymerization of the acrylic monomer mixture may be one stage polymerization or multi-stage polymerization of two or more stages.

Here, the "multi-stage polymerization" means that the polymerization of the acrylic monomer mixture is conducted in the urethane resin and then the acrylic monomer mixture is further added to the system several times in a divided manner and the polymerization is conducted.

Particularly in the method for producing the polymer particles according to the first embodiment of the invention, it is preferable that the multi-stage polymerization of two or more stages is used and the monomer (b1) having two or more radically polymerizable groups are contained in the acrylic monomer mixture to be used in the stage before the final stage, namely the step of conducting the polymerization of the acrylic monomer mixture in the urethane resin from the viewpoint of increasing the gel fraction of the polymer particles to be obtained with respect to DMF and improving the film forming property thereof. By virtue of this, the water resistance and solvent resistance of the coating film are further improved.

Furthermore, it is preferable that the multi-stage polymerization of two or more stages is used and the acid group-containing radically polymerizable monomer (b2-1) is contained at least in the acrylic monomer mixture to be used in the final stage from the viewpoint of localizing the acid group derived from the acid group-containing radically polymerizable monomer (b2-1) on the surface layer of the polymer particles. By virtue of this, the storage stability of the coating material and the water resistance of the coating film are improved. In addition, the gel fraction of the polymer particles with respect to DMF increases and the solvent resistance is further improved.

In other words, it is preferable that the method for producing a polymer dispersion containing the polymer particles according to the first and second embodiments of the invention includes a step (I) (step of first stage) of polymerizing an acrylic monomer mixture containing a monomer having two or more radically polymerizable groups in an aqueous dispersion containing a urethane resin and a step (II) (step of second stage) of obtaining the intended polymer dispersion containing polymer particles by adding an acrylic monomer mixture containing an acid group-containing radically polymerizable monomer in the dispersion obtained in the previous step.

In the method for producing a polymer dispersion containing the polymer particles according to the first and second embodiments of the invention, the reaction temperature of the step (I) is preferably from 30 to 95° C. and more preferably from 40 to 90° C. In addition, the reaction time is preferably from 1 minute to 5 hours and more preferably from 5 minutes to 3 hours. In addition, the reaction temperature of the step (II) is preferably from 40 to 95° C. and more preferably from 50 to 90° C. In addition, the reaction time is preferably from 1 minute to 10 hours and more preferably from 5 minutes to 8 hours.

The technique to supply the acrylic monomer mixture into the polymerization system is not particularly limited as long as the effect of the invention is exhibited, and examples thereof may include a technique to add the acrylic monomer mixture dropwise; a technique in which a pre-emulsion is prepared by emulsifying and dispersing the acrylic monomer mixture in advance using a surfactant and water and this pre-emulsion is added dropwise; and a technique to collectively introduce the acrylic monomer mixture. In the case of the multi-stage polymerization, two or more kinds of these techniques may be used concurrently. In the case of employing the multi-stage polymerization of two or more stages, it is preferable that the technique to collectively introduce the acrylic monomer mixture is employed in the first stage and the technique to add the pre-emulsion dropwise is employed in the second and subsequent stages.

The acrylic polymer is uniformly produced in the urethane resin by collectively introducing the acrylic monomer mixture of the first stage and conducting the emulsion polymerization as compared to the dropping polymerization, and further it is possible to obtain the acrylic polymer having a higher molecular weight as it is collective polymerization. As a result, the gel fraction of the polymer particles obtained with respect to DMF increases particularly in the polymer particles of the first embodiment, and further water resistance and solvent resistance of the coating film are improved in the polymer particles of the first and second embodiments. In addition, the polymerization stability is improved by conducting the emulsion polymerization by the technique to add the pre-emulsion dropwise for the second and subsequent stages.

(Polymerization Initiator)

In the method for producing a polymer dispersion containing the polymer particles according to the first embodiment and the method for producing a polymer dispersion containing the polymer particles according to the second embodiment of the invention, it is possible to use those which are generally used in the radical polymerization as the polymerization initiator used in polymerization of the acrylic monomer mixture, and examples thereof may include a persulfate salt such as potassium persulfate, sodium persulfate, or ammonium persulfate, an oil-soluble azo compound such as azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), or 2-phenylazo-4-methoxy-2,4-dimethylvaleronitrile; a water-soluble azo compound such as 2,2'-azobis{2-methyl-N-[1,1-bis(hydroxymethyl)-2-hydroxyethyl]propionamide}, 2,2'-azobis{2-methyl-N-[2-(1-hydroxyethyl)]propionamide}, 2,2'-azobis{2-methyl-N-[2-(1-hydroxybutyl)]propionamide}, 2,2'-azobis[2-(5-methyl-2-imidazolin-2-yl)propane] and any salt thereof, 2,2'-azobis[2-(2-imidazolin-2-yl)propane] and any salt thereof, 2,2'-azobis[2-(3,4,5,6-tetrahydropyrimidine-2-yl)propane] and any salt thereof, 2,2'-azobis(1-imino-1-pyrrolidino-2-methylpropane) and any salt thereof, 2,2'-azobis{2-[1-(2-hydroxyethyl)-2-imidazolin-2-yl]propane} and any salt thereof, 2,2'-azobis(2-methyl propionamidine) and any salt thereof, or 2,2'-azobis[N-(2-carboxyethyl)-2-methylpropionamidine] and any salt thereof; and an organic peroxide such as benzoyl peroxide, cumene hydroperoxide, t-butyl hydroperoxide, t-butyl peroxy-2-ethylhexanoate, or t-butyl peroxyisobutyrate.

Only one kind of these initiators may be used singly or two or more kinds thereof may be used concurrently.

In the method for producing a polymer dispersion containing the polymer particles according to the first embodiment and the method for producing a polymer dispersion containing the polymer particles according to the second embodiment of the invention, in the case of employing the multi-stage polymerization, the amount of the radical polymerization initiator used in the step of the first stage added is preferably from 0.001 to 10 parts by mass with respect to the total mass of the acrylic monomer mixture to be supplied to the first stage. The amount used is more preferably from 0.005 to 10 parts by mass in consideration of the progress of polymerization and the control of reaction. In addition, the amount used is even more preferably from 0.005 to 1 part by mass from the viewpoint of improving the water resistance, solvent resistance, and the weather resistance due to a higher molecular weight of the polymer particles to be finally obtained. In addition, the amount used is more preferably from 0.005 to 0.5 part by mass, even more preferably from 0.005 to 0.2 part by mass, and even more preferably from 0.005 to 0.09 part by mass from the viewpoint of decreasing the fineness modulus of the polymer dispersion to be finally obtained.

Here, the "fineness modulus" means those which are formed by the coalescence of polymers during the polymerization and in the particulate form having a particle size of greater than 1 µm, and it can be evaluated, for example, by measuring the particle size or the weight of particulate polymers remaining on the mesh after being filtered through a mesh after polymerization.

The amount of the radical polymerization initiator used in the steps of the second and subsequent stages added is preferably from 0.01 to 10 parts by mass with respect to 100 parts by mass of the total mass the acrylic monomer mixture to be supplied to each stage. Among these, the amount added is more preferably from 0.02 to 5 parts by mass in consideration of the progress of polymerization and the control of reaction.

In the polymerization, it is preferable to use a reductant such as sodium bisulfite, ferrous sulfate, any slat of ascorbic acid, and Rongalite in combination with the radical polymerization initiator described above.

Among these, it is more preferable to employ a combination of an organic peroxide such as t-butyl hydroperoxide with ferrous sulfate and any salt of ascorbic acid from the viewpoint of the progress of polymerization and water resistance, weather resistance, and solvent resistance of the coating film. The gel fraction with respect to DMF increases and especially the solvent resistance of the coating film is improved by employing this combination.

(Emulsifier)

In the method for producing a polymer dispersion containing the polymer particles according to the first embodiment and the method for producing a polymer dispersion containing the polymer particles according to the second embodiment of the invention, an emulsifier can be used if necessary. It is possible to improve the polymerization stability at the time of emulsion polymerization and to decrease the formation of aggregates when an emulsifier is used. In this case, the polymer dispersion obtained contains an emulsifier.

The content of the emulsifier is preferably usually from 0.05 to 10 parts by mass, more preferably from 0.1 to 5 parts by mass, and even more preferably from 0.5 to 2 parts by mass with respect to the total mass of the acrylic monomer mixture to be supplied to each stage.

As the emulsifier, it is possible to use the following anionic, cationic, and nonionic surfactants or a reactive surfactant.

Examples of the anionic surfactant may include a nonreactive surfactant such as potassium oleate, sodium laurate, sodium dodecyl benzene sulfonate, sodium alkane sulfonate, sodium alkyl naphthalene sulfonate, sodium dialkyl sulfosuccinate, sodium polyoxyethylene alkyl ether sulfate, sodium polyoxyethylene alkyl allyl ether sulfate, polyoxyethylene alkyl phosphoric acid ester, or polyoxyethylene alkyl allyl phosphoric acid ester and a reactive surfactant such as alkyl allyl sulfosuccinate salt (for example, ELEMINOL (registered trademark) JS-2 and JS-20 manufactured by Sanyo Chemical Industries, Ltd. and LATEMUL (registered trademark) S-180A and S-180 manufactured by Kao Corporation), polyoxyethylene alkyl propenyl phenyl ether sulfuric acid ester ammonium salt (for example, AQUALON (registered trademark) HS-10, HS-5, BC-10, and BC-5 manufactured by DKS Co., Ltd.), α-sulfo-ω-(1-(nonylphenoxy)methyl-2-(2-propenyloxyl)ethoxy)-poly(oxy-1,2-ethanediyl)ammonium salt (for example, ADEKA REASOAP (registered trademark) SE-10 and SE-1025A manufactured by ADEKA CORPORATION), polyoxyethylene-1-(allyloxymethyl)alkyl ether sulfuric acid ester ammonium salt (for example, AQUALON (registered trademark) KH-10 manufactured by DKS Co., Ltd.), α-sulfo-ω-(1-(alkoxy)methyl-2-(2-propenyloxyl)ethoxy)-poly(oxy-1,2-ethanediyl)ammonium salt (for example, ADEKA REASOAP (registered trademark) SR-10 and SR-1025 manufactured by ADEKA CORPORATION), and polyoxyalkylene alkenyl ether sulfuric acid ester ammonium salt (for example, LATEMUL (trademark) PD-104 manufactured by Kao Corporation).

Examples of the cationic surfactant may include a nonreactive surfactant such as stearylamine hydrochloride, lauryl trimethyl ammonium chloride, and trimethyloctadecyl ammonium chloride.

Examples of the nonionic surfactant may include a nonreactive surfactant such as polyoxyethylene alkyl ether, polyoxyethylene alkyl allyl ether, polyoxyethylene oxypropyl block polymer, polyethylene glycol fatty acid ester, or polyoxyethylene sorbitan fatty acid ester, and a reactive surfactant such as α-hydro-ω-(1-alkoxymethyl-2-(2-propenyloxyl)ethoxy)-poly(oxy-1,2-ethanediyl)) (ADEKA REASOAP ER-10, ER-20, ER-30, and ER-40 manufactured by ADEKA CORPORATION), polyoxyethylene alkyl propenyl phenyl ether (AQUALON RN-20, RN-30, RN-50 manufactured by DKS Co., Ltd.), and polyoxyethylene alkyl alkenyl ether (LATEMUL PD-420, PD-430, and PD-450 manufactured by Kao Corporation).

In addition, it is also possible to use zwitterionic surfactant as a zwitterionic component. These emulsifiers can be used by selecting one kind or two or more kinds.

(Basic Compound)

In the method for producing a polymer dispersion containing the polymer particles according to the first embodiment and the method for producing a polymer dispersion containing the polymer particles according to the second embodiment of the invention, it is preferable to adjust the pH to about 6.5 to 11.0 by adding a basic compound after the polymerization. By virtue of this, the stability of the polymer dispersion and the storage stability of the coating material are improved.

Examples of such a basic compound may include ammonia, triethylamine, propylamine, dibutylamine, amylamine, 1-aminooctane, 2-dimethylaminoethanol, ethylaminoethanol, 2-diethylaminoethanol, 1-amino-2-propanol 2-amino-1-propanol, 2-amino-2-methyl-1-propanol, 3-amino-1-propanol, 1-dimethylamino-2-propanol, 3-dimethylamino-1-propanol, 2-propylaminoethanol, ethoxypropylamine, aminobenzyl alcohol, morpholine, sodium hydroxide, and potassium hydroxide. Among these, an amine-based compound is preferable and 2-dimethylaminoethanol is preferably used from the viewpoint of stability of the polymer dispersion.

<Third Embodiment: Method for Producing Polymer Dispersion>

Next, the method for producing a polymer dispersion according to the third embodiment of the invention will be described.

The third embodiment of the invention is a method for producing a polymer dispersion including a step (1) of obtaining a dispersion containing a polymer P obtained by polymerizing a mixture X containing a urethane resin (A3), a monomer (b5) having two or more radically polymerizable groups, and a radically polymerizable monomer (b6) other than the monomer (b5) and a step (2) of obtaining a dispersion containing a polymer Z by adding a radically polymerizable monomer mixture Y to the dispersion containing the polymer P and conducting the polymerization, and in the method, the content of the urethane resin (A3) in the mixture X at the time of starting the reaction in the step (1) is required to be from 25 to 95% by mass with respect to the total mass of the mixture X.

A mode of the method for producing a polymer dispersion of the third embodiment of the invention is a method for producing a polymer dispersion including a step (1) of obtaining a dispersion containing a polymer P obtained by polymerizing a mixture X containing a urethane resin (A3), a monomer (b5) having two or more radically polymerizable groups, and a radically polymerizable monomer (b6) other than the monomer (b5) in a dispersion medium and a step (2) of obtaining a dispersion containing a polymer Z by adding a radically polymerizable monomer mixture Y to the dispersion containing the polymer P and conducting the polymerization, and in the method, the content of the urethane resin (A3) at the time of starting the reaction in the step (1) is from 25 to 95% by mass with respect to the total mass of the mixture X.

Hereinafter, the invention will be described in detail.

(Step (1))

In the method for producing a polymer dispersion of the third embodiment of the invention, the step (1) is a step to obtain a dispersion of a polymer P obtained by polymerizing a mixture X containing a urethane resin (A3), a monomer (b5) having two or more radically polymerizable groups, and a radically polymerizable monomer (b6) other than the monomer (b5). In addition, the step (1) in the third embodiment of the invention is preferably a step to obtain a dispersion of a polymer P by adding a polymerization initiator (C) to the mixture X containing the urethane resin (A3), the monomer (b5) having two or more radically polymerizable groups, and the radically polymerizable monomer (b6) other than the monomer (b5) and conducting the polymerization.

In the third embodiment of the invention, the content of the urethane resin (A3) in the mixture X at the time of starting the reaction in the step (1) is from 25 to 95% by mass with respect to the total mass of the mixture X. It is preferable that the content of the urethane resin (A3) in the mixture X at the time of starting the reaction in the step (1) is 25% by mass or more since the polymerization is stable, the polymerization rate of the monomer (b5) and the monomer (b6) in the urethane resin (A3) is high, and aggregates are hardly generated at the time of polymerization. In addition, a coating film exhibiting excellent water resistance, resistance to water absorption, and hydrolysis resistance is obtained without decreasing the solvent resistance of the coating film to be finally obtained. Furthermore, an effect that the washability of the coating machine is improved also obtained.

In addition, it is preferable that the content of the urethane resin (A3) in the mixture X at the time of starting the reaction in the step (1) is 95% by mass or less since the resin compatibility and the washability of the coating machine are improved and a coating film exhibiting excellent water resistance, resistance to water absorption, and hydrolysis resistance is obtained. The content of the urethane resin (A3) in the mixture X is preferably from 26 to 88% by mass, more preferably from 28 to 78% by mass, even more preferably from 30 to 68% by mass, and even more preferably from 32 to 58% by mass from the viewpoint of solvent resistance.

The "time of starting the reaction" in the present specification means the time point at which the heat generation or the like is inspected as the reaction has started or the polymerization initiator is added.

The "coating film" in the present specification means a film obtained by coating a coating material containing the polymer dispersion containing the polymer particles of the first and second embodiments or the polymer dispersion obtained by the method for producing a polymer dispersion of the third embodiment of the invention and drying it.

In addition, the term "polymerization is stable" in the present specification means the state in which abnormal heat generation and the like do not occur during the polymerization.

In addition, the "water resistance" means the resistance of the coating film obtained to water, and it can be measured, for example, by a method to observe a change of the coating film after a water droplet is dropped on the coating film obtained or a change of the coating film after the coating film is immersed in water for a constant period.

(Urethane Resin (A3))

In the third embodiment of the invention, as the urethane resin (A3) to be used, it is possible to use the same urethane resins as the urethane resin (A1) of the first embodiment and the urethane resin (A2) of the second embodiment described above and the preferred examples thereof are also the same.

In addition, in the third embodiment of the invention, in the case of using an aqueous dispersion of a urethane resin as the urethane resin (A3), the average particle size of the urethane resin in the aqueous dispersion is more preferably from 30 to 500 nm and even more preferably from 40 to 400 nm.

The average particle size can be determined by the dynamic light scattering method, and the method to measure it is the same as that in the first and second embodiments.

(Monomer (b5) Having Two or More Radically Polymerizable Groups)

In the third embodiment of the invention, the monomer (b5) refers to a monomer having two or more radically polymerizable groups. It is possible to introduce a crosslinked structure into the polymer P as the monomer (b5) and monomer (b6) which are impregnated into the urethane resin (A3) are copolymerized. It is possible to prevent the layer separation caused between the copolymer obtained from the monomer (b5) and the monomer (b6) and the urethane resin (A3) during the polymerization of these polymers P, after the polymerization, or in the coating film to be finally obtained as the polymer P has a crosslinked structure. As a result, it is possible to improve the water resistance, resistance to water absorption, and hydrolysis resistance of the coating film without decreasing the film forming property of a characteristic of the urethane resin (A3) and the solvent resistance.

In addition, it is possible to suppress that the radically polymerizable monomer mixture Y to be described later is impregnated into the inside of the polymer P and polymerized when the polymer P has a crosslinked structure and is a copolymer having a higher molecular weight. As a result, a polymer Z in which the surface of the polymer P is coated with the polymer obtained by polymerizing the radically polymerizable monomer mixture Y is obtained. This is preferable since the water resistance, resistance to water absorption, and hydrolysis resistance of the coating film to be finally obtained, resin compatibility, and the washability of the coating machine are further improved.

As the specific examples of the monomer (b5), it is possible to use the same monomers as the monomers (b1) of the first embodiment and the monomers (b3) of the second embodiment described above. Among these, it is preferable to use a radically polymerizable monomer (b5-1) having an allyl group such as allyl (meth)acrylate, triallyl isocyanurate, diallyl isophthalate, diallyl terephthalate, diallyl isocyanurate, or diallyl maleate. Such a radically polymerizable monomer (b1-1) having an allyl group exhibits relatively low radical polymerization reactivity, and thus it can form a graft crosslinking with the radically polymerizable monomer mixture Y. As a result, in the step (2) to be described later, it is possible to coat the polymer P with the polymer obtained by polymerizing the radically polymerizable monomer mixture Y. By virtue of this, the solvent resistance and water resistance of the coating film to be finally obtained are further improved.

Only one kind of the monomer (b5) may be used singly or two or more kinds thereof may be used concurrently.

The content of the monomer (b5) in the mixture X is preferably from 0.1 to 10% by mass, more preferably from 0.5 to 8% by mass, even more preferably from 1 to 6% by mass, and even more preferably from 2 to 4% by mass with respect to the total mass of the mixture X.

It is preferable that the content of the monomer (b5) in the mixture X is 0.1% by mass or more since a coating film exhibiting excellent solvent resistance and water resistance is obtained. In addition, it is preferable that the content of the monomer (b5) in the mixture X is 10% by mass or less since a coating film exhibiting excellent solvent resistance and water resistance is obtained without decreasing the flexibility, freeze-thaw resistance, and chipping resistance.

(Radically Polymerizable Monomer (b6) Other than Monomer (b5))

The content of a radically polymerizable monomer (b6) other than the monomer (b5) (hereinafter, simply referred to as the "monomer (b6)" in some cases) in the mixture X is preferably from 30 to 99.9% by mass, more preferably from 50 to 99.5% by mass, even more preferably from 70 to 99% by mass, and even more preferably from 80 to 98% by mass with respect to 100% by mass of the sum of the monomer (b5) and the monomer (b6). The flexibility, freeze-thaw resistance, and chipping resistance of the coating film are improved when the content of the monomer (b6) is 30% by mass or more with respect to 100% by mass of the sum of the monomer (b5) and the monomer (b6), and the flexibility, freeze-thaw resistance, and chipping resistance of the coating film are improved without decreasing the solvent resistance, water resistance, resistance to water absorption, hydrolysis resistance when the content of the monomer (b6) is 99.5% by mass or less.

As the monomer (b6) in the third embodiment of the invention, the same ones as the monomers (b2) of the first embodiment and the monomers (b4) described above can be exemplified, and the preferred examples thereof are also the same.

(Polymer P)

In the third embodiment of the invention, the polymer P is one which is obtained by adding the polymerization initiator (C) to the mixture X containing the urethane resin (A3), the monomer (b5), and the monomer (b6) and polymerizing the monomer (b5) and the monomer (b6). In other words, the polymer P is a copolymer of the urethane resin (A3) with the monomer (b5) and the monomer (b6).

In the step (1) in the third embodiment of the invention, it is preferable that a step of impregnating the urethane resin (A3) with the monomer (b5) and the monomer (b6) by stirring the mixture X prior to adding the polymerization initiator (C) is included. This impregnating step is not particularly limited as long as the effect of the invention is exhibited, but it is preferable to stir the mixture X for 1 minute to 24 hours under a temperature condition of from room temperature (25° C.) to 95° C. from the viewpoint of ease of impregnation of the urethane resin (A3) with the monomer (b5) and the monomer (b6) and stability of the urethane resin (A3) in the dispersion medium. In addition, it is more preferable to stir the mixture X at from room temperature (25° C.) to 90° C. for 5 minutes to 10 hours, it is even more preferable to stir the mixture X at from room temperature (25° C.) to 80° C. for 10 minutes to 5 hours, and it is even more preferable to stir the mixture X at from room temperature (25° C.) to 70° C. for 30 minutes to 3 hours.

It is considered that by including the impregnating step described above, first, the monomer (b5) and the monomer (b6) are impregnated into the urethane resin (A3). Thereafter, the monomer (b5) and the monomer (b6) are polymerized in the inside of the urethane resin (A3) as the polymerization is started, and as a result, the polymer P in which the copolymer of the monomer (b5) and the monomer (b6) having a crosslinked structure by the monomer (b5) having two or more radically polymerizable groups and the urethane resin (A3) are mixed in the particles is obtained.

When adding the polymerization initiator (C), the temperature of the mixture X may be generally decided in consideration of the 10 hour half-life temperature of the polymerization initiator (C) to be used. It is preferably usually from 10 to 90° C. and more preferably from 20 to 80° C. The temperature may be much lower than the above range in the case of combining with a redox initiator.

In the third embodiment of the invention, it is preferable to polymerize the mixture X containing the urethane resin (A3), the monomer (b5), and the monomer (b6) in a short time, and thus, a method is preferable in which the temperature at the time of starting the polymerization is set to room temperature (25° C.) and the inside of the system is raised up to from 60 to 95° C. by the heat generated by the polymerization. Thereafter, a method is preferable in which the resultant is aged at from 70 to 90° C. for about 1 to 2 hours. It is preferable to appropriately adjust the polymerization temperature and the polymerization time at this time while confirming the peak top temperature by heat generated by the polymerization.

In addition, it is also possible to use a reductant D in combination with the polymerization initiator (C) in order to accelerate the polymerization speed.

It is preferable that the weight average molecular weight of the copolymer of the monomer (b5) and the monomer (b6) is greater from the viewpoint of improving the water resistance and solvent resistance of the coating film to be finally obtained.

The copolymer of the radically polymerizable monomer (b5) and the monomer (b6) obtained in step (1) has a glass transition temperature (Tg) calculated by the equation of Fox of preferably from −80 to 0° C. and more preferably from −70 to −10° C. from the viewpoint of the flexibility, freeze-thaw resistance, and chipping resistance of the coating film to be finally obtained. The glass transition temperature is even more preferably from −60 to −20° C. and even more preferably from −50 to −30° C.

In the present specification, Tg means the value determined by the equation of Fox of the following Equation (2).

$$1/(273+Tg) = \Sigma(Wi/(273+Tgi)) \quad (2)$$

In Equation (2), Wi denotes the mass fraction of the monomer i, Tgi denotes Tg (° C.) of the homopolymer of the monomer i.

(Step (2))

In the third embodiment of the invention, the step (2) is a step of obtaining a dispersion containing a polymer Z by adding the radically polymerizable monomer mixture Y to the dispersion containing the polymer P obtained in the step (1) described above and conducting the polymerization. It is preferable that the polymer P obtained in the step (1) is coated with a polymer obtained by polymerizing the radically polymerizable monomer mixture Y (hereinafter, referred to as the "monomer mixture Y" in some cases) since the water resistance, resistance to water absorption, and hydrolysis resistance of the coating film to be finally obtained, and resin compatibility are improved and further the washability of the coating machine is improved.

In the step (2), the method to add the monomer mixture Y to the dispersion containing the polymer P is not particularly limited as long as the effect of the invention is exhibited, and examples thereof may include a technique to add only the monomer mixture Y dropwise, a technique to add a pre-emulsion prepared by emulsifying and dispersing the monomer mixture Y in water containing a surfactant dropwise, and a technique to collectively introduce only the monomer mixture Y. Among these, a technique to add a pre-emulsion prepared by emulsifying and dispersing the monomer mixture Y in water containing a surfactant dropwise to the dispersion containing the polymer P is preferable since the polymerization stability and the water resistance of the coating film to be finally obtained are improved.

(Radically Polymerizable Monomer Mixture Y)

In the third embodiment of the invention, the radically polymerizable monomer mixture Y to be added to the dispersion containing the polymer P is not particularly limited as long as the effect of the invention is exhibited, but the monomer (b5) having two or more radically polymerizable groups or the radically polymerizable monomer (b6) other than the monomer (b5) used in the step (1) may be used as the monomer mixture Y. Only one kind of these may be used singly or two or more kinds thereof may be used concurrently.

In addition, it is preferable that the monomer mixture Y contains a hydroxyl group-containing radically polymerizable monomer (b6-1) from the following point of view.

In other words, as the polymer Z contains a hydroxyl group, for example, the polymer Z can undergo a crosslinking reaction with a curing agent such as a melamine crosslinking agent or an isocyanate curing agent and the water resistance, solvent resistance and the like of the coating film to be obtained are improved. In addition, it is preferable since the stability of the polymer dispersion obtained in the aqueous medium, namely the stability of the polymer Z in the coating material of the invention is improved.

Examples of such a hydroxyl group-containing radically polymerizable monomer (b6-1) (hereinafter, simply referred to as the "monomer (b6-1)" in some cases) may include a monoester produced from (meth)acrylic acid and a dihydric alcohol having from 2 to 8 carbon atoms such as 2-hydroxyethyl (meth)acrylate, 2-hydroxypropyl (meth)acrylate, 3-hydroxypropyl (meth)acrylate, or 4-hydroxybutyl (meth)acrylate; an ε-caprolactone modified product of the monoester produced from (meth)acrylic acid and a dihydric alcohol having from 2 to 8 carbon atoms; N-hydroxymethyl(meth)acrylamide; allyl alcohol, further a (meth)acrylate having a polyoxyethylene chain having a hydroxyl group as the molecular terminal. Each of these monomers can be used singly or in combination of two or more kinds thereof.

As the hydroxyl group-containing radically polymerizable monomer (b6-1), it is possible to suitably use 2-hydroxyethyl (meth)acrylate, 2-hydroxypropyl (meth)acrylate, 3-hydroxypropyl (meth)acrylate, and 4-hydroxybutyl (meth) acrylate among them.

In the third embodiment of the invention, the proportion of the hydroxyl group-containing radically polymerizable monomer (b6-1) used is preferably from 0.1 to 10 parts by mass, more preferably from 0.3 to 8 parts by mass, and even more preferably from 0.5 to 5 parts by mass with respect to 100 parts by mass of the sum of the urethane resin (A3) and the radically polymerizable monomer to be used in until the step (2) from the viewpoint of the stability of the polymer dispersion to be obtained in the aqueous medium and the water resistance and solvent resistance of the coating film to be obtained.

In addition, it is preferable that the monomer mixture Y contains an acid group-containing radically polymerizable monomer (b6-2). It is preferable that the monomer mixture Y contains the carboxyl group-containing radically polymerizable monomer (b6-2) (hereinafter, simply referred to as the "monomer (b6-2)" in some cases) since the water resistance tends to be improved.

Examples of the acid group-containing radically polymerizable monomer (b6-2) may include an acid group-containing radically polymerizable monomer such as acrylic acid, methacrylic acid, itaconic acid, maleic acid, crotonic acid, or β-carboxyethyl acrylate. Each of these monomers can be used singly or in combination of two or more kinds thereof. Among them, it is preferable to use acrylic acid and methacrylic acid from the viewpoint of polymerizability.

The proportion of the acid group-containing radically polymerizable monomer (b6-2) used is preferably from 0.05 to 10 parts by mass, more preferably from 0.1 to 5 parts by mass, and even more preferably from 0.2 to 3 parts by mass with respect to 100 parts by mass of the sum of the urethane resin (A3) and the radically polymerizable monomer to be used in until the step (2) from the viewpoint of the stability of the polymer dispersion to be obtained in the aqueous medium.

(Polymer Z)

In the third embodiment of the invention, the polymer Z is a polymerization product obtained by polymerizing the monomer mixture Y in the dispersion containing the polymer P, and it refers to a polymer in which the surface of the polymer P is coated with the polymer of the monomer mixtures Y. Particularly in the polymer Z, the glass transition temperature (Tg) of the polymer obtained by polymerizing the monomer mixture Y in the step (2) calculated from the equation of Fox of Equation (2) is preferably from −70 to 150° C. and more preferably from −50 to 120° C. The glass transition temperature is even more preferably from −30 to 75° C. and even more preferably from −10 to 65° C. It is preferable that Tg of the polymer Z is −70° C. or higher since the solvent resistance, water resistance, resistance to water absorption, and hydrolysis resistance of the coating film are improved. In addition, it is preferable that Tg of the polymer Z is 150° C. or lower since a decrease in film forming property, flexibility, freeze-thaw resistance, and chipping resistance of the coating film can be suppressed.

In the step (2) of the third embodiment of the invention, as the polymerization initiator (C) used in the polymerization of the polymer P and the monomer mixture Y, it is possible to use those which are generally used in radical polymerization and it is possible to use the same ones as the polymerization initiators (C) in the step (1).

It is possible to obtain a dispersion containing the polymer Z, namely the polymer dispersion according to the third embodiment of the invention by adding the monomer mixture Y and the polymerization initiator (C) to the dispersion obtained in the step (1) and then conducting the polymerization at from 60 to 90° C. for from 0.5 to 3 hours and preferably at from 70 to 80° C. for from 0.6 to 2 hours.

(Polymerization Initiator (C))

In the third embodiment of the invention, as the polymerization initiator (C) used in the step (1) and the step (2), the same ones as the polymerization initiators described in the first embodiment and the second embodiment are exemplified and the preferable examples thereof are also the same.

In the third embodiment of the invention, the amount of the radical polymerization initiator (C) used in the step (1) added is preferably from 0.001 to 10% by mass with respect to the total mass of the mixture X other than the urethane polymer (A3). The amount added is more preferably from 0.005 to 10% by mass in consideration of the progress of polymerization and the control of reaction. In addition, the amount added is even more preferably from 0.005 to 1% by mass from the viewpoint of improving the water resistance, solvent resistance, and weather resistance due to a higher molecular weight of the polymer Z to be finally obtained. In addition, the amount added is more preferably from 0.005 to 0.5% by mass, even more preferably from 0.005 to 0.2% by mass, and even more preferably from 0.005 to 0.09% by mass from the viewpoint of decreasing the fineness modulus at the time of polymerizing the polymer P and the polymer Z.

(Other Additives)

[Emulsifier]

In the third embodiment of the invention, the mixture X may contain an emulsifier if necessary. It is preferable that the mixture X contains an emulsifier since the stability of the urethane resin (A3), namely the dispersibility thereof in water is improved. In addition, it is preferable since the polymerization stability of the mixture X can be improved and the formation of aggregates at the time of the polymerization can be decreased.

As the emulsifier used in the third embodiment of the invention, the same ones as the emulsifiers in the first embodiment and the second embodiment are exemplified and the preferred examples thereof are also the same. In addition, in the third embodiment of the invention, the amount of the emulsifier added is usually from 0.05 to 10% by mass, preferably from 0.1 to 5% by mass, and more preferably from 0.5 to 2% by mass with respect to the total mass of the mixture X.

[Reductant D]

In the third embodiment of the invention, it is preferable that a water-soluble azo compound such as 2,2'-azobis[2-(2-imidazolin-2-yl)propane] and any salt thereof having a 10 hour half-life temperature of 70° C. or lower or sodium bisulfite, ferrous sulfate, any salt of ascorbic acid, Rongalite, and the like are used as the reductant D in combination with the radical polymerization initiator (C) described above.

Among these, it is more preferable to use a combination of an organic peroxide such as t-butyl hydroperoxide and ferrous sulfate, any salt of ascorbic acid, and the like from the viewpoint of the progress of the polymerization and the water resistance and weather resistance of the coating film.

[Molecular Weight Modifier]

In the third embodiment of the invention, a molecular weight modifier may be added for the purpose of adjusting the molecular weight of the copolymer obtained from the radically polymerizable monomer (b5) and the monomer (b6) in the polymer P in the step (1) or the molecular weight of the polymer of the monomer mixture Y in the step (2). The molecular weight modifier can be added together with the monomer (b5) and the monomer (b6) other than the urethane resin (A3) in the step (I). In addition, the molecular weight modifier can be added together with the monomer mixture Y in the step (2).

In the third embodiment of the invention, as the molecular weight modifier, it is preferable to use a known chain transfer agent such as a mercaptan including n-dodecylmercaptan, t-dodecylmercaptan, n-octylmercaptan, n-tetradecylmercaptan, and n-hexylmercaptan; a halogen compound including carbon tetrachloride and ethylene bromide; and α-methylstyrene dimer. The amount of the molecular weight modifier used is preferably 1% by mass or less with respect to the total amount of the radically polymerizable monomer (b5) and the monomer (b6). In addition, the amount used is preferably 1% by mass or less with respect to the total mass of the monomer mixture Y.

In the case of using a molecular weight modifier in the step (1) and the step (2), the molecular weight modifiers used in the step (1) and the step (2) may be the same as or different from each other.

<Polymer Dispersion>

The average particle size of the polymer particles in the polymer dispersion containing the polymer particles of the first embodiment or the second embodiment and the average particle size of the polymer particles obtained by the method for producing a polymer dispersion of the third embodiment of the invention are preferably from 10 to 1000 nm, more preferably from 30 to 500 nm, even more preferably from 50 to 400 nm, and even more preferably from 70 to 300 nm, respectively, from the viewpoint of the film forming property, water resistance, resistance to water absorption, hydrolysis resistance, and solvent resistance of the coating film.

Incidentally, the average particle size of the polymer particles in the present specification is the value measured at room temperature (25° C.) using a concentrated system particle size analyzer FPAR-1000 manufactured by OTSUKA ELECTRONICS Co., LTD. and calculated by cumulant analysis.

In addition, the concentrations of solid matter (concentration of polymer particles) in the polymer dispersion containing the polymer particles of the first or second embodiment and the polymer dispersion obtained by the method for producing a polymer dispersion of the third embodiment of the present invention are preferably from 10 to 80% by mass and more preferably from 20 to 70% by mass, respectively. It is preferable that the concentration of solid matter in the polymer dispersion is from 10 to 80% by mass since it is easy to adjust the viscosity and the final solid matter at the time of forming the polymer dispersion into a coating material.

In addition, the polymer dispersion containing the polymer particles of the first or second embodiment and the polymer dispersion obtained by the method for producing a polymer dispersion of the third embodiment of the invention contain the polymer particles described above and a dispersion medium, respectively, and water is preferable as the dispersion medium. In other words, it is preferable that the polymer dispersions according to these embodiments contain the polymer particles at from 10 to 80% by mass and water at from 20 to 90% by mass.

<Coating Material>

Another embodiment of the invention is a coating material which contains the polymer dispersion containing the polymer particles of the first embodiment, the polymer dispersion containing the polymer particles of the second embodiment, or the polymer dispersion obtained by the method for producing a polymer dispersion of the third embodiment. It is preferable that the coating material contains various kinds of additives.

Examples of the additives may include various kinds of additives such as various kinds of pigments, resin beads, an anti-foaming agent, a pigment dispersing agent, a leveling agent, an anti-sagging agent, a curing catalyst, a matting agent, a ultraviolet absorber, a light stabilizer, an antioxidant, a heat resistant improver, a slip agent, a preservative, a plasticizer, a thickener, and a solvent, and one or more kinds among these can be used.

In addition, in the coating material, other polymer particles (for example, dispersed particles composed of another polymer such as a polyester-based resin, a polyurethane-based resin, an acrylic resin, an acrylic silicone-based resin, a silicone-based resin, a fluorine-based resin, an epoxy-based resin, a polyolefin resin, or an alkyd resin) and a curing agent such as a water-soluble resin, a viscosity controlling agent, an amino resin, a polyvalent isocyanate compound, a blocked polyvalent isocyanate compound, a melamine resin, a urea resin, a carboxyl group-containing compound, a carboxyl group-containing resin, an epoxy group-containing resin, an epoxy group-containing compound, or a carbodiimide group-containing compound may be mixed.

Examples of the pigment may include a coloring pigment, an extender pigment, and a luster pigment.

Examples of the coloring pigment may include titanium oxide, zinc oxide, carbon black, molybdenum red, Prussian blue, cobalt blue, an azobased pigment, a phthalocyanine-based pigment, a quinacridone-based pigment, an isoindoline-based pigment, a threne-based pigment, and a perylene-based pigment.

Examples of the extender pigment may include clay, kaolin, barium sulfate, barium carbonate, calcium carbonate, talc, silica, and alumina white.

Examples of the luster pigment may include aluminum, copper, zinc, brass, nickel, aluminum oxide, mica, aluminum oxide covered with titanium oxide or iron oxide, mica covered with titanium oxide or iron oxide, glass flakes, and a hologram pigment.

One or more kinds of these can be used.

In another embodiment of the invention, the coating material may further contain a solvent.

As the solvent, those which are usually used in an aqueous paint can be used. Examples of such a solvent may include a straight, branched or cyclic aliphatic alcohol having from 5 to 14 carbon atoms; an alcohol containing an aromatic group; a monoether such as a (poly)ethylene glycol or (poly)propylene glycol represented by Formula HO—$(CH_2CHXO)_p$—$R_4$ ($R_4$ is a straight or branched alkyl group having from 1 to 10 carbon atoms, X is a hydrogen atom or a methyl group, p is an integer of 5 or less); a (poly)ethylene glycol ether ester or a (poly)propylene glycol ether ester represented by Formula $R_5COO$—$(CH_2CHXO)_q$—$R_6$ ($R_5$ and $R_6$ are a straight or branched alkyl group having from 1 to 10 carbon atoms, X is a hydrogen atom or a methyl group, q is an integer of 5 or less); an aromatic organic solvent such as toluene or xylene; mono- or diisobutyrate of 2,2,4-trimethyl-1,3-pentanediol, 3-methoxy butanol, 3-methoxybutanol acetate, 3-methyl-3-methoxy butanol, and 3-methyl-3-methoxybutanol acetate.

Among these, a straight, branched, or cyclic aliphatic alcohol having from 5 to 14 carbon atoms is preferable, an alcohol-based hydrophobic solvent having from 7 to 14 carbon atoms is even more preferable, and at least one kind of alcohol-based hydrophobic solvent selected from the group consisting of 1-octanol, 2-octanol, 2-ethyl-1-hexanol, ethylene glycol mono-2-ethylhexyl ether, propylene glycol mono-n-butyl ether, and dipropylene glycol mono-n-butyl ether is even more preferable.

The concentration of the polymer particles in the coating material according to another embodiment of the invention is preferably from 1 to 80% by mass and more preferably from 2 to 70% by mass. The paint viscosity characteristics and the water resistance and solvent resistance of the coating film are excellent when the concentration is in this range.

In addition, in a case in which the coating material contains other polymer particles other than the polymer particles of the invention, it is preferable that the polymer particles are contained at 5,000 parts by mass or less with respect to 100 parts by mass of the polymer particles of the invention from the viewpoint of the paint viscosity characteristics and the water resistance and solvent resistance of the coating film.

An aspect of the invention is the polymer dispersion containing the polymer particles of the first embodiment, namely, the polymer particles containing the urethane resin (A1) and the acrylic polymer (B1) in the same particle, the use of the polymer dispersion containing the polymer particles having a gel fraction measured in N,N-dimethylformamide (DMF) of 10% or more as a starting material of a coating material, or a method for producing a coating material using the polymer dispersion containing the polymer particles of the first embodiment as a starting material.

In addition, another aspect of the invention is the polymer dispersion containing the polymer particles of the second embodiment, namely, the polymer particles containing the urethane resin (A2) and the acrylic polymer (B2) in the same particle, the use of the polymer dispersion containing the polymer particles having a surface acid value measured by the potentiometric titration of from 0.1 to 19 mg KOH/g as a starting material of a coating material, or a method for producing a coating material using the polymer dispersion containing the polymer particles of the second embodiment as a starting material.

In addition, another aspect of the invention is the use of the polymer dispersion obtained by the method for producing a polymer dispersion of the third embodiment as a starting material of a coating material or a method for producing a coating material using the polymer dispersion obtained by the producing method of the third embodiment as a starting material.

In the case of using the polymer dispersion containing the polymer particles of the first or second embodiment of the invention as a starting material of a coating material, it is preferable to contain additives such as a solvent and a thickener in addition to the polymer dispersion.

In a mode of the invention, the method for producing a coating material is preferably a method which includes a step of mixing the polymer dispersion containing the polymer particles of the first or second embodiment or the polymer dispersion obtained by the producing method of the third embodiment, a solvent, and a thickener using a disperser.

In addition, in a mode of the invention, it is preferable to contain the polymer particles of the first or second embodiment at from 1 to 70% by mass, a solvent at from 0.1 to 30% by mass, and a thickener at from 0.01 to 5% by mass with respect to the total mass of the coating material.

In addition, in a mode of the invention, it is preferable to contain the polymer particles obtained by the producing method of the third embodiment at from 1 to 70% by mass, a solvent at from 0.1 to 30% by mass, and a thickener at from 0.01 to 5% by mass with respect to the total mass of the coating material.

<Coated Article>

In the invention, the coated article is a coated article having a coating film formed by coating a coating material containing the polymer dispersion containing the polymer particles of the first or second embodiment or the polymer dispersion obtained by the producing method of the third embodiment of the invention.

There is no particular restriction on the location coated with the coating material to form a coating film, and the coating material can be coated on various substrates or articles to form a coated article.

Examples of the substrate may include the outer plate of a motor vehicle body, a motor vehicle interior base material, cement mortar, a slate plate, a gypsum board, an extrusion plate, foam concrete, a metal, glass, porcelain tile, asphalt, wood, a waterproof rubber material, a plastic, a calcium silicate base material, a PVC sheet, FRP (Fiber Reinforced Plastics), natural leather, synthetic leather, and a fiber.

Specific examples of the article coated with the coating material of the invention may include interior and exterior of a passenger car, building exterior, a structural member, an outdoor display board, and a display such as TV or PC.

(Method for Forming Coating Film)

As the method to coat the coating material on the surface of various substrates, it is possible to appropriately select various kinds of coating methods such as air spray coating, airless spray coating, rotary atomization coating, curtain coating, roller coating, bar coating, an air knife coating, brush coating, and dipping coating.

The amount of the coating material coated is preferably usually an amount to be about from 0.1 to 100 µm more preferably an amount to be from 1 to 50 µm, and even more preferably an amount to be from 10 to 40 µm as the film thickness after drying the coating film obtained by coating the coating material.

In addition, the drying temperature after coating is preferably set to room temperature (5 to 35° C.) or a range of higher than 35° C. and 200° C. or lower, namely from 5 to 200° C. In particular the coating material of the invention can form a coating film exhibiting excellent water resistance and solvent resistance even under a drying condition of a low temperature and a short time, and thus it is preferable to employ room temperature (5 to 35° C.) drying or low temperature drying (higher than 35° C. and 100° C. or lower), that is, it is preferable to dry at from 5 to 100° C. and it is more preferable to dry at from 5 to 80° C. from the viewpoint of energy saving. In addition, the drying time is, for example, preferably from 30 seconds to 5 minutes. According to the coating material of the invention, it is possible to form a coating film exhibiting excellent water resistance and solvent resistance even under a condition in which the evaporation of water and solvent and the fusion of the particles are insufficient.

In addition, drying after coating may be conducted by two or more steps. For example, the preliminary step such as preheating or air blow may be conducted and then the main step may be conducted at a higher temperature than the preliminary step using a drying oven such as a hot air oven, an electric oven, or an infrared induction heating oven. In the case of conducting preheating, the time for preheating is preferably about from 30 seconds to 15 minutes, more preferably from 1 to 10 minutes, and even more preferably from 2 to 5 minutes. The temperature and time for the main step can be appropriately selected from the above preferred ranges, respectively.

After preheating is conducted under the above conditions, the coating material can be heated and cured by a known heating means to form a coating film. As the known heating means, for example, it is possible to use a drying oven such as a hot air oven, an electric oven, or an infrared induction heating oven. The heating temperature is preferably usually from 40 to 200° C., more preferably from 60 to 180° C., and even more preferably from 80 to 160° C. The heating time is not particularly limited as long as the effect of the invention is exhibited, but it is preferably usually about from 10 to 60 minutes and particularly about from 20 to 40 minutes.

In a mode of the invention, it is preferable that a gloss retention of the coating film after being immersed in solvent naphtha (CAS: 64742-95-6) for 30 seconds is 60% or more in the coated article, particularly the coated article obtained by coating a coating material containing the polymer particles of the first embodiment. By having such solvent resistance, it is possible to form a favorable coating film without disturbance of the painted surface even under a drying condition of a low temperature and a short time, for example, even in a case in which a paint containing solvent naphtha (CAS: 64742-95-6) is painted to overlap the coating material. The gloss retention is more preferably of 70% or more and even more preferably 80% or more.

Here, the "gloss retention" refers to the 60° gloss retention after a test plate for evaluation is immersed in solvent naphtha (CAS: 64742-95-6) for 30 seconds, the solvent remaining on the surface of the coating film is removed, and the test plate is dried at room temperature for 2 hours. Incidentally, the 60° gloss retention (%) is a value represented by "(G2/G1)×100" where "01" denotes the 60° gloss retention of the coating film before being subjected to the test and "G2" denotes the 60° gloss retention of the coating film after being immersed in solvent naphtha (CAS: 64742-95-6) for 30 seconds and then dried at room temperature for 2 hours.

Such a 60° gloss retention can be measured using PG-1M manufactured by NIPPON DENSHOKU INDUSTRIES Co., LTD. and the like.

In addition, solvent naphtha of CAS: 64742-95-6 is a hydrocarbon mixture obtained by distillation of aroma stream, and it refers to solvent naphtha mainly composed of aromatic hydrocarbons having from 8 to 10 carbon atoms and a boiling point in a range of about from 135 to 210° C.

As described above, according to the invention, it is possible to provide a polymer dispersion which exhibits excellent polymerization stability and excellent paint viscosity characteristics and storage stability when being used in a coating material, a method for producing the polymer dispersion, and polymer particles contained in the polymer dispersion. In addition, according to the invention, it is possible to provide a coating material which can form a coating film exhibiting excellent water resistance and solvent resistance even under a drying condition of a low temperature and a short time and a coated article coated with the coating material. Moreover, the coated article having a coating film formed from the coating material of the invention can exert excellent appearance of coating film, solvent resistance, water resistance, resistance to water absorption, and hydrolysis resistance.

EXAMPLES

Hereinafter, the invention will be described in detail with reference to Examples and Comparative Examples, but the invention is not limited to these Examples.

Incidentally, unless otherwise stated, the "part" means the "parts by mass" and "%" means "% by mass" in the present Examples. In addition, the measurement, evaluation, and the like for the polymer dispersion and coating material in the present Examples were carried out by the following methods.

In addition, the blending parts of the respective components at the time of producing the polymer dispersion in the respective Examples, the measurement results and evaluation results, and the like of the respective Examples are presented in Tables 1 to 12.

<Gel Fraction with Respect to DMF in Polymer Particles of First Embodiment>

The polymer dispersion is coated on a polypropylene plate so as to have a dry film thickness of 200 μm and dried at 23° C. for 24 hours to obtain a coating film. A sample having a weight of from 0.035 to 0.045 g is cut out from the coating film thus obtained, and the weight of the sample is measured to determine the "weight of the coating film before being immersed in DMF". Thereafter, the sample is put in 20 ml of DMF and immersed at 23° C. for 24 hours. After immersion, the DMF containing the sample is filtered using a polytetrafluoroethylene resin (PTFE) filter (product name: PF100 manufactured by Toyo Roshi Kaisha, Ltd.), then dried at 105° C. for 3 hours and cooled, and the "total weight of the coating film (residue after filtration) after being immersed in DMF and the filter" is measured. The "weight of the coating film before being immersed in DMF", the "weight of the filter", and the "total weight of the coating film (residue after filtration) after being immersed in DMF and the filter" are substituted into the following Equation (1) to determine the gel fraction.

$$\text{Gel fraction (\%)} = (\text{"total weight of coating film (residue after filtration) after being immersed in DMF and filter"} - \text{"weight of filter"})/(\text{"weight of coating film before being immersed in DMF"}) \times 100 \quad (1)$$

<Surface Acid Value of Polymer Particles in Polymer Particles of Second Embodiment>

With 100 g of deionized water, 2 g of the polymer dispersion was diluted, and the polymer dispersion diluted was subjected to potentiometric titration using an automatic potentiometric titrator (AT-610 manufactured by KYOTO ELECTRONICS MANUFACTURING CO., LTD.), and the surface acid value of the polymer particles was calculated by the following Equation (3). As the titrant, 0.1 mol/L of potassium hydroxide in methanol (manufactured by KANTO KAGAKU) was used.

$$AV = (g \times 0.1 \times f \times 56.1)/S \quad (3)$$

The symbols in Equation (3) represent the following values.

AV: Surface acid value of polymer particles (mg KOH/g)
g: titer of potassium hydroxide (mL)
f: calibration factor of potassium hydroxide
S: mass of polymer particles (g, solid matter)

<Viscosity (Ti) of Coating Material in Polymer Particles of Second Embodiment>

The coating material was introduced into a polyethylene container of 250 ml, capped, left to stand for 3 hours in a thermostatic bath at 25° C., and then subjected to the measurement of a viscosity η at 6 rpm and immediately a viscosity at 60 rpm under a measurement condition of 25° C. using a B type viscometer (Model TV-10M, #3 rotor manufactured by TOKI SANGYO CO., LTD.), and Ti was calculated from the viscosity η (60 rpm) at 60 rpm and the viscosity η (6 rpm) at 6 rpm by the following Equation (4).

$$Ti = \eta(6 \text{ rpm})/\eta(60 \text{ rpm}) \quad (4)$$

Incidentally, in the invention, it can be judged to have a favorable viscosity when the Ti value is from 4.5 to 8.5.

<Storage Stability of Coating Material Containing Polymer Particles of First or Second Embodiment>

The coating material containing the polymer particles of the first or second embodiment was introduced into a polyethylene container of 250 ml, capped, left to stand for 3 hours in a thermostatic bath at 25° C., and then subjected to the measurement of a viscosity η 1 at 6 rpm using a B type viscometer (Model TV-10M, #3 rotor manufactured by TOKI SANGYO CO., LTD.) when the temperature of the coating material became 25° C. Thereafter, the coating material was left to still stand for 10 days under an atmosphere of 40° C., then left to stand for 3 hours in a thermostatic bath at 25° C., and then subjected to the measurement of a viscosity η 2 at 6 rpm using a B type viscometer when the temperature of the coating material became 25° C., and the rate of viscosity change was calculated by the following Equation (5).

$$V=\{(\eta 2-\eta 1)/\eta 1\}\times 100 \qquad (5)$$

Here, symbols in Equation (5) represent the following values.

V: rate of viscosity change (%)
η1: initial viscosity (mPa·s, 6 rpm)
η2: viscosity after leaving to still stand at 40° C. for 10 days (mPa·s, 6 rpm)

The rate of viscosity change (%) thus obtained was evaluated according to the following criteria.
A: rate of viscosity change is within ±20%
B: rate of viscosity change is within ±50%
C: rate of viscosity change exceeds ±50%

<Water Resistance and Solvent Resistance of Coating Film>

(Fabrication of Test Plate for Evaluation)

The coating material obtained in each of Examples was painted on a black acrylic plate (thickness: 2 mm, 150 mm long×70 mm wide manufactured by T.P GIKEN) in an atmosphere of 20° C. using a bar coater #40 and dried in a drying condition of a low temperature (80° C.) and a short time (3 minutes). Thereafter, the resultant was left to stand at room temperature for 30 minutes and used as the test plate for evaluation of solvent resistance and water resistance. The film thickness after drying of the coating film was set to about 20 μm.

<Evaluation of Water Resistance>

The test plate for evaluation was immersed in warm water at 40° C. for 10 days, then withdrawn therefrom, dried at room temperature for 2 hours, and subjected to the measurement of the 60° gloss retention and the ΔL, and these values were used as the indexes of water resistance.

Incidentally, the 60° gloss retention (%) is a value represented by "(G2/G1)×100" where "G1" denotes the 60° gloss retention of the coating film before being subjected to the test and "G2" denotes the 60° gloss retention of the coating film after being immersed in warm water at 40° C. for 10 days, then withdrawn therefrom, and dried at room temperature for 2 hours. The 60° gloss retention was measured using PG-1M manufactured by NIPPON DENSHOKU INDUSTRIES Co., LTD.

In addition, the ΔL is a value obtained by subtracting the "L value of the coating film before being subjected to the test" from the "L value of the coating film after being immersed in warm water at 40° C. for 10 days, then withdrawn therefrom, and dried at room temperature for 2 hours". The L value is an index of the "lightness (whiteness)" and was measured using CR-300 manufactured by Konica Minolta, Inc.

In addition, in each invention, the evaluation of water resistance was evaluated based on the following criteria.

(Coating Film Obtained from Coating Material Containing Polymer Particles of First Embodiment)
A: 60° gloss retention is 90% or more and absolute value of ΔL is 0.5 or less
B: 60° gloss retention is 80% or more and absolute value of ΔL is more than 0.5 and 1.5 or less (Coating Film Obtained from Coating Material Containing Polymer Particles of Second Embodiment)
A: absolute value of ΔL is 0.5 or less
B: absolute value of ΔL is more than 0.5 and 1.5 or less (Coating Film Obtained from Coating Material Containing Polymer Dispersion of Third Embodiment)
[Water Resistance (1)]

On the test plate for evaluation, 1 μL of water droplet was dropped using a microsyringe and the entire water droplet was wiped off with KimWipes after 2 minutes. The degree of whitening of water droplet mark was visually observed immediately after wiping off the water droplet and judged according to the following criteria.

"A": it is not whitened
"B": it is slightly whitened
"C": it is significantly whitened

[Water Resistance (2)]

The 60° gloss retention and the ΔL measured after immersing the test plate for evaluation in warm water at 40° C. for 10 days, then immersing in water at room temperature for 30 minutes, withdrawing, and drying at room temperature for 2 hours were used as the indexes of water resistance.

[Gloss Retention]
"A": 90% or more
"B": 80% or more and less than 90%
"C": 70% or more and less than 80%
"D": less than 70% or coating film is dissolved, peeled off, or cracked [ΔL]
"A": less than 0.5
"B": 0.5 or more and less than 1.0
"C": 1.0 or more and less than 1.5
"D": 1.5 or more or coating film is dissolved, peeled off, or cracked <Evaluation of Solvent Resistance>

The test plate for evaluation was immersed in SOLVESSO 100 (aromatic solvent manufactured by Exxon Mobil Chemical Company, solvent naphtha (CAS: 64742-95-6)) for 30 seconds, and the solvent remaining on the surface of the coating film was blotted with KimWipes immediately after withdrawing it therefrom. The 60° gloss retention and the ΔL (difference in L values before and after being immersed in a solvent) measured after drying at room temperature for 2 hours were used as the indexes of solvent resistance.

Incidentally, the 60° gloss retention (%) is a value represented by "(G2/G1)×100" where "G1" denotes the 60° gloss retention of the coating film before being subjected to the test and "G2" denotes the 60° gloss retention after the coating film is immersed in SOLVESSO 100 for 30 seconds, the solvent remaining on the surface of the coating film is blotted with KimWipes immediately after withdrawing it therefrom, and the coating film is dried at room temperature for 2 hours. The 60° gloss retention was measured using PG-1M manufactured by NIPPON DENSHOKU INDUSTRIES Co., LTD.

In addition, the ΔL is a value obtained by subtracting the "L value of the coating film before being subjected to the test" from the "L value of the coating film after the coating film is immersed in SOLVESSO 100 for 30 seconds, the solvent remaining on the surface of the coating film is blotted with KimWipes immediately after withdrawing it therefrom, and the coating film is dried at room temperature for 2 hours". The L value is an index of the "lightness (whiteness)" and was measured using CR-300 manufactured by Konica Minolta, Inc.

In addition, the solvent resistance was evaluated based on the following criteria.

(Coating Film Obtained from Coating Material Containing Polymer Particles of First or Second Embodiment)

A: 60° gloss retention is 80% or more and absolute value of ΔL is 1.0 or less

B: 60° gloss retention is 60% or more and absolute value of ΔL is more than 1.0 and 1.5 or less C: 60° gloss retention is less than 60% and absolute value of ΔL is more than 1.5

(Coating Film Obtained from Coating Material Containing Polymer Dispersion of Third Embodiment)

[Gloss Retention]

"A": 80% or more

"B": 60% or more and less than 80%

"C": 40% or more and less than 60%

"D": less than 40% or coating film is dissolved, peeled off, or cracked [ΔL]

"A": less than 1.0

"B": 1.0 or more and less than 2.0

"C": 2.0 or more and less than 3.5

"D": 3.5 or more or coating film is dissolved, peeled off, or cracked

<Examples According to First Embodiment>

Example 1A

Preparation of Polymer Dispersion (1) Polymerization Step of First Stage (Collective Introduction of Acrylic Monomer Mixture)

Into a flask equipped with a stirrer, a reflux condenser, a temperature control device, and a dropping pump, 75 parts (30 parts as solid matter) of a polyester-based urethane resin (trade name: IMPRANIL LP RSC 3040 manufactured by Sumika Bayer Urethane Co., Ltd., solid matter: 40%) as the urethane resin (A1), 73.2 parts of deionized water, 0.4 part (solid matter: 0.28 part) of NEOCOL SWC (anionic surfactant, manufactured by DKS Co., Ltd., solid matter: 70%), 0.4 part of ADEKA REASOAP ER-10 (nonionic surfactant, manufactured by ADEKA CORPORATION) and 5.95 parts of methyl methacrylate, 43.4 parts of n-butyl acrylate, and 0.05 part of allyl methacrylate as the acrylic monomer mixture were introduced, and the temperature of the flask was raised to 50° C. Thereafter, 0.02 part (0.014 part as pure matter) of a 70% aqueous solution of t-butyl hydroperoxide (trade name; Kayabutyl 1-170 manufactured by Kayaku Akzo Corporation) as the polymerization initiator, and 0.00020 part of ferrous sulfate, 0.00027 part of ethylenediaminetetraacetic acid (EDTA), 0.02 part of sodium ascorbate, and 1 part of deionized water as the reductant were added thereto. In addition, after confirming the peak top temperature by heat generated by the polymerization, the internal temperature of the flask was raised to 75° C. and kept at the temperature for 20 minutes.

(2) Polymerization Step of Second Stage (Dropwise Addition of Pre-Emulsion)

Subsequently, 0.1 part of sodium ascorbate and 5 parts of deionized water as the reductant were added to the dispersion obtained in (1) above, and the mixture was kept at 75° C. for 10 minutes, and a pre-emulsion which contained 11 parts of methyl methacrylate, 8.1 parts of 2-ethylhexyl acrylate, 1.14 parts of 2-hydroxyethyl methacrylate, 0.36 part of acrylic acid, 0.4 part (solid matter: 0.28 part) of NEOCOL SW-C, 0.4 part of ADEKA REASOAP ER-10, and 16 parts of deionized water and was emulsified and dispersed in advance and an aqueous solution of polymerization initiator containing 0.03 part (0.021 part as pure matter) of a 70% aqueous solution of t-butyl hydroperoxide (trade name: Kayabutyl H70 manufactured by Kayaku Akzo Corporation) and 5 parts of deionized water were then added thereto dropwise over 1 hour. The internal temperature of the flask was kept at 75° C. during the dropwise addition and at 75° C. for 1.5 hours after the dropwise addition was completed. Thereafter, the reaction mixture was cooled to room temperature, 0.52 part of dimethylaminoethanol and 5 parts of deionized water as the aqueous solution of amine were added thereto, thereby obtaining the dispersion (polymer dispersion) containing the polymer particles of the invention.

Incidentally, the non-volatile matter and the average particle size of the dispersion thus obtained are presented in Table 1.

(Preparation of Coating Material)

To the polymer dispersion thus obtained, 12 parts (11.8% with respect to the solid matter of the polymer dispersion obtained) of 2-ethyl-1-hexanol as the solvent and 0.6 part (0.6% with respect to the solid matter of the polymer dispersion obtained) of a urethane associative thickener (trade name: UH-756-VF manufactured by ADEKA CORPORATION) as the thickener were added and mixed together, thereby preparing the coating material. The concentration of the polymer particles in the coating material thus obtained was set to 37.7%.

The coating material thus obtained was then coated on the test plate for evaluation as described above to form a coating film, and the water resistance and solvent resistance of the coating film were evaluated. In addition, the storage stability of the coating material was evaluated. The evaluation results are presented in Table 1.

Examples 3A to 13A

The polymer dispersions and the coating materials were prepared by the same operations as in Example 1A except that the respective components as presented in Tables 1 and 2 were used. Thereafter, the same measurements and evaluation as in Example 1A were carried out. The evaluation results are presented in Tables 1 and 2.

Example 2A

Preparation of Polymer Dispersion (1) Polymerization step of first stage (dropwise addition of acrylic monomer mixture)

Into a flask equipped with a stirrer, a reflux condenser, a temperature control device, and a dropping pump, 75 parts (30 parts as solid matter) of a polyester-based urethane resin (trade name: IMPRANIL LP RSC 3040 manufactured by Sumika Bayer Urethane Co., Ltd., solid matter: 40%) as the urethane resin (A1), 68.2 parts of deionized water, 0.4 part (solid matter: 0.28 part) of NEOCOL SWC (anionic surfactant, manufactured by DKS Co., Ltd., solid matter: 70%), and 0.4 part of ADEKA REASOAP ER-10 (nonionic surfactant, manufactured by ADEKA CORPORATION) were introduced, and the temperature of the flask was raised to 50° C. Thereto, 0.00020 part of ferrous sulfate, 0.00027 part of ethylenediaminetetraacetic acid (EDTA), 0.12 part of sodium ascorbate, and 1 part of deionized water as the reductant were added. Thereafter, a mixture of 5.95 parts of methyl methacrylate, 43.4 parts of n-butyl acrylate, and 0.05 part of allyl methacrylate as the acrylic monomer mixture and an aqueous solution of polymerization initiator containing 0.032 part (0.0224 part as pure matter) of a 70% aqueous solution of t-butyl hydroperoxide (trade name; Kayabutyl H70 manufactured by Kayaku Akzo Corporation) and 10 parts of deionized water were added thereto dropwise over 1 hour and 45 minutes. The internal temperature of the flask was kept at 50° C. during the dropwise addition, raised to 75° C. and kept at the temperature for 20 minutes after the dropwise addition was completed.

(2) Polymerization step of second stage (dropwise addition dropwise addition of pre-emulsion)

Subsequently, a pre-emulsion which contained 11 parts of methyl methacrylate, 8.1 parts of 2-ethylhexyl acrylate, 1.14 parts of 2-hydroxyethyl methacrylate, 0.36 part of acrylic acid, 0.4 part (solid matter: 0.28 part) of NEOCOL SW-C, 0.4 part of ADEKA REASOAP ER-10, and 16 parts of deionized water and was emulsified and dispersed in advance and an aqueous solution of polymerization initiator containing 0.018 part (0.0126 part as pure matter) of a 70% aqueous solution of t-butyl hydroperoxide (trade name: Kayabutyl H70 manufactured by Kayaku Akzo Corporation) and 5 parts of deionized water were then added thereto dropwise over 1 hour. The internal temperature of the flask was kept at 75° C. during the dropwise addition and at 75° C. for 1.5 hours after the dropwise addition was completed Thereafter, the reaction mixture was cooled to room temperature, 0.52 part of dimethylaminoethanol and 5 parts of deionized water as the aqueous solution of amine were added thereto, thereby obtaining the dispersion (polymer dispersion) containing the polymer particles of the invention.

Incidentally, the non-volatile matter and the average particle size of the dispersion thus obtained are presented in Table 1.

The coating material was prepared by the same operation as in Example 1A. Thereafter, the same measurements and evaluation as in Example 1 A were carried out. The evaluation results are presented in Table 1.

Comparative Examples 1A and 2A

The polymer dispersions and the coating materials were prepared by the same operations as in Example 1A except that the respective components as presented in Table 2 were used. Thereafter, the same measurements and evaluation as in Example 1A were carried out. The evaluation results are presented in Table 2.

TABLE 1

| | | | Example 1A | Example 2A | Example 3A | Example 4A | Example 5A | Example 6A | Example 7A | Example 8A |
|---|---|---|---|---|---|---|---|---|---|---|
| Urethane resin | | Kind | I-1 | I-1 | I-1 | I-1 | I-1 | I-1 | I-1 | I-1 |
| | | Amount of solid matter introduced | 30 | 30 | 30 | 30 | 30 | 30 | 30 | 30 |
| Acrylic monomer mixture | First stage | MMA | 5.95 | 5.95 | 5.9 | 5.5 | 4.5 | 3.8 | 3 | 2 |
| | | nBA | 43.4 | 43.4 | 43.4 | 43.4 | 43.4 | 43.4 | 43.4 | 43.4 |
| | | AMA | 0.05 | 0.05 | 0.1 | 0.5 | 1.5 | 2.2 | 3 | 4 |
| | | TAC | — | — | — | — | — | — | — | — |
| | | EDMA | — | — | — | — | — | — | — | — |
| | Second stage | MMA | 11 | 11 | 11 | 11 | 11 | 11 | 11 | 11 |
| | | 2EHA | 8.1 | 8.1 | 8.1 | 8.1 | 8.1 | 8.1 | 8.1 | 8.1 |
| | | HEMA | 1.14 | 1.14 | 1.14 | 1.14 | 1.14 | 1.14 | 1.14 | 1.14 |
| | | AMA | — | — | — | — | — | — | — | — |
| | | AA | 0.36 | 0.36 | 0.36 | 0.36 | 0.36 | 0.36 | 0.36 | 0.36 |
| Values of physical properties | Gel fraction to DMF (%) | | 61.6 | 22.2 | 70.3 | 73.2 | 73.6 | 73.0 | 67.7 | 68.9 |
| | Average particle size (nm) | | 177 | 193 | 178 | 193 | 199 | 188 | 187 | 197 |
| | Storage stability of aqueous coating material (Rate of viscosity change, %) | | 4 / A | 8 / A | 3 / A | 5 / A | 6 / A | 2 / A | 11 / A | −1 / A |
| | Water resistance | Gloss retention (%) | 99 / A | 99 / A | 97 / A | 96 / A | 95 / A | 86 / B | 96 / A | 96 / A |
| | | ΔL | 0.3 / A | 0.3 / A | 0.4 / A | 0.3 / A | 0.1 / A | 0.7 / B | 0.3 / A | 0.2 / A |
| | Appearance immediately after being withdrawn | | Favorable | Favorable | Favorable | Favorable | Favorable | Favorable | Favorable | Favorable |
| | Solvent resistance | Gloss retention (%) | 79 / B | 99 / A | 84 / A | 84 / A | 95 / A | 95 / A | 99 / A | 96 / A |
| | | ΔL | 0.9 / A | 0.3 / A | 0.4 / A | 0.5 / A | 0.5 / A | 0.3 / A | 0.1 / A | 0 / A |

TABLE 2

| | | | Example 9A | Example 10A | Example 11A | Example 12A | Example 13A | Comparative Example 1A | Comparative Example 2A |
|---|---|---|---|---|---|---|---|---|---|
| Urethane resin | | Kind | I-1 | I-1 | I-1 | I-1 | I-2 | I-1 | I-1 |
| | | Amount of solid matter introduced | 30 | 30 | 30 | 30 | 30 | 30 | 30 |

TABLE 2-continued

|  |  |  | Example 9A | Example 10A | Example 11A | Example 12A | Example 13A | Comparative Example 1A | Comparative Example 2A |
|---|---|---|---|---|---|---|---|---|---|
| Acrylic monomer mixture | First stage | MMA | 1 | 3.8 | 3.8 | 3.7 | 3.8 | 6 | 6 |
|  |  | nBA | 43.4 | 43.4 | 43.4 | 43.4 | 43.4 | 43.4 | 43.4 |
|  |  | AMA | 5 | — | — | 1.6 | 2.2 | — | — |
|  |  | TAC | — | 2.2 | — | 0.7 | — | — | — |
|  |  | EDMA | — | — | 2.2 | — | — | — | — |
|  | Second stage | MMA | 11 | 11 | 11 | 10.3 | 11 | 11 | 10.95 |
|  |  | 2EHA | 8.1 | 8.1 | 8.1 | 8.1 | 8.1 | 8.1 | 8.1 |
|  |  | HEMA | 1.14 | 1.14 | 1.14 | 1.14 | 1.14 | 1.14 | 1.14 |
|  |  | AMA | — | — | — | 0.7 | — | — | 0.05 |
|  |  | AA | 0.36 | 0.36 | 0.36 | 0.36 | 0.36 | 0.36 | 0.36 |
| Values of physical properties | Gel fraction with respect to DMF (%) |  | 66.3 | 76.4 | 59.6 | 77.9 | 90.5 | 4.8 | 7.2 |
|  | Average particle size (nm) |  | 198 | 191 | 193 | 202 | 213 | 190 | 199 |
|  | Storage stability of aqueous coating material (Rate of viscosity change, %) |  | 13 A | 16 A | −9 A | −10 A | 13 A | 23 B | 12 A |
|  | Water resistance | Gloss retention (%) | 99 A | 98 A | 97 A | 85 B | 89 B | 100 A | 100 A |
|  |  | ΔL | 0.0 A | 0.1 A | 0.2 A | 0.5 A | −0.9 B | 0.2 A | 0.3 A |
|  | Appearance immediately after being withdrawn |  | Favorable | Favorable | Favorable | Favorable | Favorable | Coating film is dissolved | Coating film is swollen |
|  | Solvent resistance | Gloss retention (%) | 97 A | 93 A | 100 A | 101 A | 79 B | Unmeasurable due to dissolution of coating film | 49 C |
|  |  | ΔL | 0.2 A | 0.5 A | 0.1 A | 0.4 A | 1.3 B |  | 2.0 C |

The abbreviations in Tables 1 and 2 represent the following compounds.

[Urethane Resin (A1)]
I-1: a polyester-based urethane resin having a sulfonic acid group (trade name: IMPRANIL LP RSC 3040 manufactured by Sumika Bayer Urethane Co., Ltd., solid matter: 40%)
I-2: a polycarbonate-based urethane resin having a sulfonic acid group (trade name: F-8082D manufactured by DKS Co., Ltd., solid matter: 41%)

[Acrylic Monomer Mixture]
(Monomer (b2) having one radically polymerizable group)
MMA: methyl methacrylate
NBA: n-butyl acrylate
2EHA: 2-ethylhexyl acrylate
(Monomer (b1) Having Two or More Radically Polymerizable Groups)
AMA: allyl methacrylate
TAC: triallyl cyanurate
EDMA: ethylene dimethacrylate
(Acid Group-Containing Radically Polymerizable Monomer (b2-1))
AA: acrylic acid
(Hydroxyl Group-Containing Radically Polymerizable Monomer (b2-2))
2HEMA: 2-hydroxyethyl methacrylate As presented in Tables 1 and 2, the polymer dispersions of the respective Examples 1A to 13A exhibited excellent polymerization stability, and the coating materials obtained from the dispersions exhibited excellent storage stability. Moreover, the coating films obtained from the coating materials were equipped with both excellent water resistance and solvent resistance even though drying thereof was conducted under the condition of a low temperature and a short time of 80° C. and 3 minutes.

On the other hand, as presented in Table 2, in Comparative Examples 1A and 2A, the gel fraction with respect to DMF was less than 10%, and thus dissolution or swelling of the coating film was confirmed in the evaluation on the solvent resistance of the coating film and the solvent resistance thereof was inferior.

<Examples According to Second Embodiment>

Example 1B

Preparation of polymer dispersion (1) Polymerization step of first stage (collective introduction of acrylic monomer mixture)

Into a flask equipped with a stirrer, a reflux condenser, a temperature control device, and a dropping pump, 75 parts (30 parts as solid matter) of a polyester-based urethane resin (trade name: IMPRANIL LP RSC 3040 manufactured by Sumika Bayer Urethane Co., Ltd., solid matter: 40%) as the urethane resin (A2), 73.2 parts of deionized water, 0.4 part (solid matter: 0.28 part) of NEOCOL SWC (anionic surfactant, manufactured by DKS Co., Ltd., solid matter: 70%), 0.4 part of ADEKA REASOAP ER-10 (nonionic surfactant, manufactured by ADEKA CORPORATION), and 3.7 parts of methyl methacrylate, 43.4 parts of n-butyl acrylate, 1.6 parts of allyl methacrylate, and 0.7 part of triallyl isocyanurate as the radically polymerizable monomers were introduced, and the temperature of the flask was raised to 50° C. Thereafter, 0.02 part (0.014 part as pure matter) of a 70% aqueous solution of t-butyl hydroperoxide (trade name; Kayabutyl H70 manufactured by Kayaku Akzo Corporation) as the polymerization initiator, and 0.00020 part of ferrous sulfate, 0.00027 part of ethylenediaminetetraacetic acid (EDTA), 0.02 part of sodium ascorbate, and 1 part of deionized water as the reductant were added thereto. In addition, after confirming the peak top temperature by heat generated by the polymerization, the internal temperature of the flask was raised to 75° C. and kept at the temperature for 20 minutes.

(2) Polymerization step of second stage (dropwise addition of pre-emulsion)

Subsequently, 0.1 part of sodium ascorbate and 5 parts of deionized water as the reductant were added to the dispersion obtained in (1) above, and the mixture was kept at 75° C. for 10 minutes, and a pre-emulsion which contained 11.43 parts of methyl methacrylate, 7.4 parts of 2-ethylhexyl acrylate, 1 part of 2-hydroxyethyl methacrylate, 0.7 part of allyl methacrylate, 0.07 part of acrylic acid, 0.4 part (solid matter: 0.28 part) of NEOCOL SW-C, 0.4 part of ADEKA REASOAP ER-10, and 16 parts of deionized water and was emulsified and dispersed in advance and an aqueous solution of polymerization initiator containing 0.03 part (0.021 part as pure matter) of a 70% aqueous solution of t-butyl hydroperoxide (trade name: Kayabutyl H70 manufactured by Kayaku Akzo Corporation) and 5 parts of deionized water were then added thereto dropwise over 1 hour. The internal temperature of the flask was kept at 75° C. during the dropwise addition, and at 75° C. for 1.5 hours after the dropwise addition was completed. Thereafter, the reaction mixture was cooled to room temperature, 0.52 part of dimethylaminoethanol and 5 parts of deionized water as the aqueous solution of amine were added thereto, thereby obtaining the dispersion (polymer dispersion) containing the polymer particles of the invention.

Thereafter, the surface acid value and the average particle size of the polymer particles thus obtained were measured. The concentration of solid matter is presented in Table 7.

(Preparation of Coating Material)

To the polymer dispersion thus obtained, 12 parts (11.8% with respect to the solid matter of the polymer dispersion obtained) of 2-ethyl-1-hexanol as the solvent and 0.6 part (0.6% with respect to the solid matter of the polymer dispersion obtained) of a urethane associative thickener (trade name: UH-756-VF manufactured by ADEKA CORPORATION) as the thickener were added and mixed together, thereby preparing the coating material. The concentration of the polymer particles in the coating material thus obtained was set to 38.4%.

The coating material thus obtained was then coated on the test plate for evaluation as described above to form a coating film, and the water resistance and solvent resistance of the coating film were evaluated. In addition, the viscosity and storage stability of the coating material were evaluated. The evaluation results are shown in Table 7.

Examples 2B to 16B

The polymer dispersions and the coating materials were prepared by the same operations as in Example 1B except that the respective components as presented in Tables 3 to 5 were used. Thereafter, the same measurements and evaluation as in Example 1B were carried out. The evaluation results are shown in Tables 7 and 8.

Comparative Examples 1B to 4B

The polymer dispersions and the coating materials were prepared by the same operations as in Example 1 except that the respective components as presented in Table 6 were used. Thereafter, the same measurements and evaluation as in Example 1 were carried out. The evaluation results are shown in Table 9.

TABLE 3

| | | | | Example | | | | |
|---|---|---|---|---|---|---|---|---|
| | | | | 1B | 2B | 3B | 4B | 5B |
| Polymer dispersion (parts by mass) | Initial introduction | Ratio of urethane/acryl (parts by mass) | | 30/70 | 30/70 | 30/70 | 30/70 | 30/70 |
| | | Deionized water | | 73.2 | 73.2 | 73.2 | 73.2 | 73.2 |
| | | NEOCOL SW-C | | 0.4 | 0.4 | 0.4 | 0.4 | 0.4 |
| | | ADEKA REASOAP ER-10 | | 0.4 | 0.4 | 0.4 | 0.4 | 0.4 |
| | | Urethane resin (A2) | Kind | I-1 | I-1 | I-1 | I-1 | I-1 |
| | | | Acid group | Sulfonic acid group | Sulfonic acid group | Sulfonic acid group | Sulfonic acid group | Sulfonic acid group |
| | | | Introduced amount | 75 | 75 | 75 | 75 | 75 |
| | | | Amount of solid matter introduced | 30 | 30 | 30 | 30 | 30 |
| | Polymerization step of first stage | Acrylic monomer mixture | MMA | 3.7 | 3.7 | 3.7 | 3.7 | 3.7 |
| | | | nBA | 43.4 | 43.4 | 43.4 | 43.4 | 43.4 |
| | | | AMA | 1.6 | 1.6 | 1.6 | 1.6 | 1.6 |
| | | | TAC | 0.7 | 0.7 | 0.7 | 0.7 | 0.7 |
| | | Aqueous solution of initiator | Kayabutyl H70 | 0.02 | 0.02 | 0.02 | 0.02 | 0.02 |
| | | Aqueous solution of reductant | Ferrous sulfate | 0.0002 | 0.0002 | 0.0002 | 0.0002 | 0.0002 |
| | | | EDTA | 0.00027 | 0.00027 | 0.00027 | 0.00027 | 0.00027 |
| | | | Sodium ascorbate | 0.02 | 0.02 | 0.02 | 0.02 | 0.02 |
| | | | Deionized water | 1 | 1 | 1 | 1 | 1 |
| | Polymerization step of second stage | Aqueous solution of reductant | Sodium ascorbate | 0.1 | 0.1 | 0.1 | 0.1 | 0.1 |
| | | | Deionized water | 5 | 5 | 5 | 5 | 5 |
| | | Aqueous solution of initiator | Kayabutyl H70 | 0.03 | 0.03 | 0.03 | 0.03 | 0.03 |
| | | | Deionized water | 5 | 5 | 5 | 5 | 5 |
| | | Acrylic monomer mixture for pre-emulsification | MMA | 11.43 | 11.37 | 11.3 | 11.24 | 11.14 |
| | | | 2EHA | 7.4 | 7.4 | 7.4 | 7.4 | 7.4 |
| | | | nBA | 0 | 0 | 0 | 0 | 0 |
| | | | 2HEMA | 1 | 1 | 1 | 1 | 1 |
| | | | AMA | 0.7 | 0.7 | 0.7 | 0.7 | 0.7 |
| | | | AA | 0.07 | 0.13 | 0.2 | 0.26 | 0.36 |
| | | | MAA | 0 | 0 | 0 | 0 | 0 |

TABLE 3-continued

|  |  |  | Example | | | | |
|---|---|---|---|---|---|---|---|
|  |  |  | 1B | 2B | 3B | 4B | 5B |
|  | Emulsifier for pre-emulsification | NEOCOL SW-C | 0.4 | 0.4 | 0.4 | 0.4 | 0.4 |
|  |  | ADEKA REASOAP ER-10 | 0.4 | 0.4 | 0.4 | 0.4 | 0.4 |
|  |  | Deionized water | 16 | 16 | 16 | 16 | 16 |
|  | Aqueous solution of amine | Dimethylaminoethanol | 0.1 | 0.18 | 0.28 | 0.37 | 0.52 |
|  |  | Deionized water | 5 | 5 | 5 | 5 | 5 |

TABLE 4

|  |  |  |  | Example | | | | |
|---|---|---|---|---|---|---|---|---|
|  |  |  |  | 6B | 7B | 8B | 9B | 10B |
| Polymer dispersion (parts by mass) |  | Ratio of urethane/acryl (parts by mass) |  | 30/70 | 30/70 | 30/70 | 30/70 | 30/70 |
|  | Initial introduction | Deionized water |  | 73.2 | 73.2 | 73.2 | 73.2 | 73.2 |
|  |  | NEOCOL SW-C |  | 0.4 | 0.4 | 0.4 | 0.4 | 0.4 |
|  |  | ADEKA REASOAP ER-10 |  | 0.4 | 0.4 | 0.4 | 0.4 | 0.4 |
|  |  | Urethane resin (A2) | Kind | I-1 | I-1 | I-1 | I-1 | I-1 |
|  |  |  | Acid group | Sulfonic acid group | Sulfonic acid group | Sulfonic acid group | Sulfonic acid group | Sulfonic acid group |
|  |  |  | Introduced amount | 75 | 75 | 75 | 75 | 75 |
|  |  |  | Amount of solid matter introduced | 30 | 30 | 30 | 30 | 30 |
|  | Polymerization step of first stage | Acrylic monomer mixture | MMA | 3.7 | 3.7 | 3.7 | 3.7 | 3.7 |
|  |  |  | nBA | 43.4 | 43.4 | 43.4 | 43.4 | 43.4 |
|  |  |  | AMA | 1.6 | 1.6 | 1.6 | 1.6 | 1.6 |
|  |  |  | TAC | 0.7 | 0.7 | 0.7 | 0.7 | 0.7 |
|  |  | Aqueous solution of initiator | Kayabutyl H70 | 0.02 | 0.02 | 0.02 | 0.02 | 0.02 |
|  |  | Aqueous solution of reductant | Ferrous sulfate | 0.0002 | 0.0002 | 0.0002 | 0.0002 | 0.0002 |
|  |  |  | EDTA | 0.00027 | 0.00027 | 0.00027 | 0.00027 | 0.00027 |
|  |  |  | Sodium ascorbate | 0.02 | 0.02 | 0.02 | 0.02 | 0.02 |
|  |  |  | Deionized water | 1 | 1 | 1 | 1 | 1 |
|  | Polymerization step of second stage | Aqueous solution of reductant | Sodium ascorbate | 0.1 | 0.1 | 0.1 | 0.1 | 0.1 |
|  |  |  | Deionized water | 5 | 5 | 5 | 5 | 5 |
|  |  | Aqueous solution of initiator | Kayabutyl H70 | 0.03 | 0.03 | 0.03 | 0.03 | 0.03 |
|  |  |  | Deionized water | 5 | 5 | 5 | 5 | 5 |
|  |  | Acrylic monomer mixture for pre-emulsification | MMA | 10.8 | 10.1 | 8.35 | 8.14 | 11.14 |
|  |  |  | 2EHA | 7.4 | 7.4 | 7.4 | 7.4 | 7.4 |
|  |  |  | nBA | 0 | 0 | 0 | 0 | 0 |
|  |  |  | 2HEMA | 1 | 1 | 1 | 1 | 1 |
|  |  |  | AMA | 0.7 | 0.7 | 0.7 | 0.7 | 0.7 |
|  |  |  | AA | 0.7 | 1.4 | 3.15 | 3.36 | 0 |
|  |  |  | MAA | 0 | 0 | 0 | 0 | 0.36 |
|  |  | Emulsifier for pre-emulsification | NEOCOL SW-C | 0.4 | 0.4 | 0.4 | 0.4 | 0.4 |
|  |  |  | ADEKA REASOAP ER-10 | 0.4 | 0.4 | 0.4 | 0.4 | 0.4 |
|  |  |  | Deionized water | 16 | 16 | 16 | 16 | 16 |
|  | Aqueous solution of amine |  | Dimethylaminoethanol | 1.01 | 2.02 | 4.55 | 4.85 | 0.43 |
|  |  |  | Deionized water | 5 | 5 | 100 | 100 | 5 |

TABLE 5

|  |  |  |  | Example | | | | | |
|---|---|---|---|---|---|---|---|---|---|
|  |  |  |  | 11B | 12B | 13B | 14B | 15B | 16B |
| Polymer dispersion (parts by mass) |  | Ratio of urethane/acryl (parts by mass) |  | 30/70 | 30/70 | 50/50 | 70/30 | 30/70 | 30/70 |
|  | Initial introduction | Deionized water |  | 75 | 75 | 60 | 30 | 73.2 | 73.2 |
|  |  | NEOCOL SW-C |  | 0 | 0 | 0 | 0 | 0.4 | 0.4 |
|  |  | ADEKA REASOAP ER-10 |  | 0 | 0 | 0 | 0 | 0.4 | 0.4 |
|  |  | Urethane resin (A2) | Kind | I-2 | I-2 | I-2 | I-2 | I-1 | I-1 |
|  |  |  | Acid group | Sulfonic acid group | Sulfonic acid group | Sulfonic acid group | Sulfonic acid group | Sulfonic acid group | Sulfonic acid group |
|  |  |  | Introduced amount | 73.2 | 73.2 | 122 | 170.7 | 75 | 75 |
|  |  |  | Amount of solid matter introduced | 30 | 30 | 50 | 70 | 30 | 30 |

TABLE 5-continued

|  |  |  | Example | | | | | |
|---|---|---|---|---|---|---|---|---|
|  |  |  | 11B | 12B | 13B | 14B | 15B | 16B |
| Polymerization step of first stage | Acrylic monomer mixture | MMA | 3.7 | 2.4 | 2.7 | 1.6 | 3.7 | 3.7 |
|  |  | nBA | 43.5 | 43.5 | 31.4 | 18.6 | 43.4 | 43.4 |
|  |  | AMA | 2.2 | 3.5 | 1.6 | 0.9 | 1.6 | 1.6 |
|  |  | TAC | 0 | 0 | 0 | 0 | 0.7 | 0.7 |
|  | Aqueous solution of initiator | Kayabutyl H70 | 0.02 | 0.02 | 0.01 | 0.006 | 0.02 | 0.02 |
|  | Aqueous solution of reductant | Ferrous sulfate | 0.0002 | 0.0002 | 0.00001 | 0.00006 | 0.0002 | 0.0002 |
|  |  | EDTA | 0.00027 | 0.00027 | 0.000014 | 0.00009 | 0.00027 | 0.00027 |
|  |  | Sodium ascorbate | 0.02 | 0.02 | 0.01 | 0.006 | 0.02 | 0.02 |
|  |  | Deionized water | 1 | 1 | 1 | 1 | 1 | 1 |
| Polymerization step of second stage | Aqueous solution of reductant | Sodium ascorbate | 0.1 | 0.1 | 0.05 | 0.03 | 0.1 | 0.1 |
|  |  | Deionized water | 5 | 5 | 5 | 5 | 5 | 5 |
|  | Aqueous solution of initiator | Kayabutyl H70 | 0.03 | 0.03 | 0.015 | 0.01 | 0.03 | 0.03 |
|  |  | Deionized water | 5 | 5 | 5 | 5 | 5 | 5 |
|  | Acrylic monomer mixture for pre-emulsification | MMA | 11.14 | 11.14 | 7.33 | 4.74 | 10.14 | 15.94 |
|  |  | 2EHA | 7.4 | 7.4 | 5.3 | 3.2 | 0 | 3.3 |
|  |  | nBA | 0 | 0 | 0 | 0 | 8.4 | 0 |
|  |  | 2HEMA | 1 | 1 | 0.9 | 0.5 | 1 | 1 |
|  |  | AMA | 0.7 | 0.7 | 0.5 | 0.3 | 0.7 | 0 |
|  |  | AA | 0.36 | 0.36 | 0.27 | 0.16 | 0.36 | 0.36 |
|  |  | MAA | 0 | 0 | 0 | 0 | 0 | 0 |
|  | Emulsifier for pre-emulsification | NEOCOL SW-C | 0.4 | 0.4 | 0.3 | 0.2 | 0.4 | 0.4 |
|  |  | ADEKA REASOAP ER-10 | 0.4 | 0.4 | 0.3 | 0.2 | 0.4 | 0.4 |
|  |  | Deionized water | 16 | 16 | 13 | 10 | 16 | 16 |
| Aqueous solution of amine |  | Dimethylaminoethanol | 0.52 | 0.52 | 0.36 | 0.22 | 0.52 | 0.52 |
|  |  | Deionized water | 5 | 5 | 5 | 5 | 5 | 5 |

TABLE 6

|  |  |  | Comparative Example 1B | Comparative Example 2B | Comparative Example 3B | Comparative Example 4B |
|---|---|---|---|---|---|---|
| Polymer dispersion (parts by mass) |  | Ratio of urethane/acryl (parts by mass) | 30/70 | 30/70 | 30/70 | 30/70 |
|  | Initial introduction | Deionized water | 73.2 | 73.2 | 80 | 80 |
|  |  | NEOCOL SW-C | 0.4 | 0.4 | 0.4 | 0.4 |
|  |  | ADEKA REASOAP ER-10 | 0.4 | 0.4 | 0.4 | 0.4 |
|  |  | Urethane resin (A2) Kind | I-1 | I-1 | I-3 | I-3 |
|  |  | Acid group | Sulfonic acid group | Sulfonic acid group | Carboxyl group | Carboxyl group |
|  |  | Introduced amount | 75 | 75 | 100 | 100 |
|  |  | Amount of solid matter introduced | 30 | 30 | 30 | 30 |
| Polymerization step of first stage | Acrylic monomer mixture | MMA | 3.7 | 3.7 | 3.7 | 3.7 |
|  |  | nBA | 43.4 | 43.4 | 43.4 | 43.4 |
|  |  | AMA | 1.6 | 1.6 | 2.3 | 2.3 |
|  |  | TAC | 0.7 | 0.7 | 0 | 0 |
|  | Aqueous solution of initiator | Kayabutyl H70 | 0.02 | 0.02 | 0.02 | 0.02 |
|  | Aqueous solution of reductant | Ferrous sulfate | 0.0002 | 0.0002 | 0.0002 | 0.0002 |
|  |  | EDTA | 0.00027 | 0.00027 | 0.00027 | 0.00027 |
|  |  | Sodium ascorbate | 0.02 | 0.02 | 0.02 | 0.02 |
|  |  | Deionized water | 1 | 1 | 1 | 1 |
| Polymerization step of second stage | Aqueous solution of reductant | Sodium ascorbate | 0.1 | 0.1 | 0.1 | 0.1 |
|  |  | Deionized water | 5 | 5 | 5 | 5 |
|  | Aqueous solution of initiator | Kayabutyl H70 | 0.03 | 0.03 | 0.03 | 0.03 |
|  |  | Deionized water | 5 | 5 | 5 | 5 |
|  | Acrylic monomer mixture for pre-emulsification | MMA | 11.5 | 8 | 11.5 | 11.14 |
|  |  | 2EHA | 7.4 | 7.4 | 7.4 | 7.4 |
|  |  | nBA | 0 | 0 | 0 | 0 |
|  |  | 2HEMA | 1 | 1 | 1 | 1 |
|  |  | AMA | 0.7 | 0.7 | 0.7 | 0.7 |
|  |  | AA | 0 | 3.5 | 0 | 0.36 |
|  | Emulsifier for pre-emulsification | NEOCOL SW-C | 0.4 | 0.4 | 0.4 | 0.4 |
|  |  | ADEKA REASOAP ER-10 | 0.4 | 0.4 | 0.4 | 0.4 |
|  |  | Deionized water | 16 | 16 | 16 | 16 |
| Aqueous solution of amine |  | Dimethylaminoethanol | 0 | 5.06 | 0 | — |
|  |  | Deionized water | 0 | 100 | 0 | — |

TABLE 7

| | Example | | | | | | | | | |
|---|---|---|---|---|---|---|---|---|---|---|
| | 1B | 2B | 3B | 4B | 5B | 6B | 7B | 8B | 9B | 10B |
| Surface acid value of polymer particles (mg KOH/g) | 0.80 | 1.07 | 1.28 | 1.53 | 2.27 | 3.94 | 6.80 | 17.37 | 18.7 | 1.20 |
| Average particle size of polymer particles (nm) | 202 | 203 | 201 | 198 | 204 | 203 | 213 | 219 | 224 | 198 |
| Concentration of solid matter (polymer particles) in polymer dispersion | 40.3 | 40.3 | 40.4 | 40.3 | 40.4 | 40.1 | 40 | 29.7 | 29.9 | 40.5 |
| Evaluation result — Viscosity of aqueous coating material (Ti) | 5.4 | 6.2 | 6.8 | 6.9 | 7.5 | 7.6 | 5.6 | 6.6 | 5.2 | 7.5 |
| Storage stability of aqueous coating material (Rate of viscosity change, %) | −20 | −9 | −5 | −6 | −6 | 8 | 9 | 24 | 38 | −7 |
| Water resistance ΔL | 1.3 | 1.4 | 1.5 | 0.9 | 0.9 | 1.1 | 1.2 | 0.2 | 0.4 | 0.8 |
| Solvent resistance Gloss retention (%) | 100 | 100 | 99 | 99 | 97 | 100 | 99 | 98 | 98 | 102 |
| ΔL | 0.2 | 0.3 | 0.3 | 0.3 | 0.6 | 0.1 | 0.3 | 0.1 | 0.3 | 0.1 |

TABLE 8

| | Example | | | | | |
|---|---|---|---|---|---|---|
| | 11B | 12B | 13B | 14B | 15B | 16B |
| Surface acid value of polymer particles (mg KOH/g) | 2.25 | 2.29 | 1.58 | 1.18 | 2.22 | 2.30 |
| Average particle size of polymer particles (nm) | 234 | 239 | 219 | 222 | 201 | 220 |
| Concentration of solid matter (polymer particles) in polymer dispersion | 40.3 | 40.2 | 38.3 | 39 | 40.5 | 40.4 |
| Evaluation result — Viscosity of aqueous coating material (Ti) | 7.1 | 7.5 | 7.1 | 7.3 | 7 | 7.7 |
| Storage stability of aqueous coating material (Rate of viscosity change, %) | −7 | −6 | −11 | −18 | −9 | −1 |
| Water resistance ΔL | 0.9 | 0.9 | −0.9 | −0.4 | 1.2 | 0.3 |
| Solvent resistance Gloss retention (%) | 97 | 97 | 97 | 97 | 100 | 100 |
| ΔL | 0.6 | 0.6 | 0.6 | 0.6 | 0.5 | 0.8 |

TABLE 9

| | Comparative Example | | | |
|---|---|---|---|---|
| | 1B | 2B | 3B | 4B |
| Surface acid value of polymer particles (mg KOH/g) | 0 | 19.35 | 3.83 | — |
| Average particle size of polymer particles (nm) | 197 | 242 | 99 | — |
| Concentration of solid matter (polymer particles) in polymer dispersion | 41.3 | 29.9 | 36.0 | — |
| Evaluation result — Viscosity of aqueous coating material (Ti) | 5.1 | 5.8 | 5.5 | It is aggregated in polymerization step of second stage |
| Storage stability of aqueous coating material (Rate of viscosity change, %) | −66 | 84 | 139 | |
| Water resistance ΔL | 1.5 | Coating film is peeled off | 0.4 | |
| Solvent resistance Gloss retention (%) | 98 | 98 | 80 (Peeled off) | |
| ΔL | 0.3 | 0.2 | 2.4 | |

However, the abbreviations in Tables 3 to 9 represent the same compounds as the abbreviations in Tables 1 and 2 described above.

The polymer dispersions of the respective Examples 1B to 16B exhibited excellent polymerization stability, and the coating materials obtained from the dispersions exhibited excellent paint viscosity characteristics and storage stability. Moreover, the coating films obtained from the coating materials were equipped with both excellent water resistance and solvent resistance even though drying thereof was conducted under the condition of a low temperature and a short time of 80° C. and 3 minutes.

On the other hand, in Comparative Example 1B, the surface acid value of the polymer particles was less than 0.1 mg KOH/g and thus the storage stability when the polymer particles was formed into a coating material was inferior.

In Comparative Example 2B, the surface acid value of the polymer particles was more than 19 mg KOH/g, the polymerization stability of the polymer particles and the storage stability when the polymer particles was formed into a coating material were inferior. In addition, the coating film was peeled off and suspended in water when being immersed for 10 days in warm water at 40° to be inferior in water resistance as well.

In Comparative Example 3B, the dispersing group (acid group) of the urethane resin was not a sulfonic acid group but was a carboxyl group, and thus the storage stability when the polymer particles was formed into a coating material was inferior.

In Comparative Example 4B, the acid group of the urethane resin was not a sulfonic acid group but was a carboxyl group, and thus the polymerization stability at the time of polymerizing the monomers containing the acid group-containing radically polymerizable monomer (b4-1) was inferior and aggregation was observed in the polymerization step of the second stage.

<Examples According to Third Embodiment>

Example 1C

Preparation of Polymer Dispersion

<Step (1)>

Into a flask equipped with a stirrer, a reflux condenser, a temperature control device, and a dropping pump, a mixture containing 73.2 parts (30 parts as solid matter) of a polycarbonate-based urethane resin (trade name: F-8082D manufactured by DKS Co., Ltd., solid matter: 41%) as the urethane resin (A3), 2.2 parts of allyl methacrylate as the monomer (b5), 3.7 parts of methyl methacrylate and 43.5 parts of n-butyl acrylate as the monomer (b6), and 75 parts of deionized water was introduced, and the temperature of the flask was raised to 50° C. Thereafter, 0.02 part of an aqueous solution of t-butyl hydroperoxide (trade name; Kayabutyl H70 manufactured by Kayaku Akzo Corporation) as the polymerization initiator (C), and 0.00020 part of ferrous sulfate, 0.00027 part of ethylenediaminetetraacetic acid (EDTA), 0.02 part of sodium ascorbate, and 1 part of deionized water as the reductant D were added thereto. In addition, after confirming the peak top temperature by heat generated by the polymerization, the internal temperature of the flask was raised to 75° C. and kept at the temperature for 20 minutes, thereby preparing the polymer dispersion containing the polymer P.

(Step 2)

Subsequently, 0.1 part of sodium ascorbate and 5 parts of deionized water as the reductant D were added to the dispersion, and the mixture was kept at 75° C. for 10 minutes, and the monomer mixture b (pre-polymer dispersion emulsified and dispersed in advance) containing 11 parts of methyl methacrylate, 7.4 parts of 2-ethylhexyl acrylate, 1.0 part of 2-hydroxyethyl methacrylate, 0.7 part of allyl methacrylate, 0.5 part of acrylic acid, 0.4 part (solid matter: 0.28 part) of NEOCOL SW-C, 0.4 part of ADEKA REASOAP ER-10, and 16 parts of deionized water and a polymerization initiator (C) containing 0.03 part (0.021 part as pure matter) of an aqueous solution of t-butyl hydroperoxide (trade name: Kayabutyl H70 manufactured by Kayaku Akzo Corporation) and 5 parts of deionized water were then added thereto dropwise over 1 hour. The internal temperature of the flask was kept at 75° C. during the dropwise addition and at 75° C. for 1.5 hours after the dropwise addition was completed. Thereafter, the reaction mixture was cooled to room temperature, 0.52 part of dimethylaminoethanol and 5 parts of deionized water as the aqueous solution of amine were added thereto, thereby obtaining the polymer dispersion of the invention.

(Preparation of Coating Material)

To the polymer dispersion thus obtained, 12 parts of 2-ethyl-1-hexanol as the solvent and 0.6 part of a urethane associative thickener (trade name: UH-756-VF manufactured by ADEKA CORPORATION) as the thickener were added and mixed together, thereby preparing the coating material. The coating material thus obtained was then coated on the test plate for evaluation to form a coating film, and the water resistance and solvent resistance of the coating film were evaluated. The results of the test for the coating film thus obtained are presented in Table 10.

Examples 2C, 5C to 7C, and 10C to 15C

The polymer dispersions and the coating materials were prepared by the same operations as in Example 1C except that the amounts added, kinds, and producing methods of the monomer (b5), the monomer (b6), the urethane resin (A3), and the monomer mixture Y were changed as presented in Table 10-12. The coating material thus obtained was then coated on the test plate for evaluation to form a coating film, and the water resistance and solvent resistance of the coating film were evaluated. The results of the test for the coating film thus obtained are presented in Tables 10 to 12.

Example 3C

Into a flask equipped with a stirrer, a reflux condenser, a temperature control device, and a dropping pump, a mixture containing 73.2 parts (30 parts as solid matter) of a polycarbonate-based urethane resin as the urethane resin (A3) and 86 parts of deionized water was introduced, and the temperature of the flask was raised to 50° C. Thereafter, 0.00020 part of ferrous sulfate, 0.00027 part of ethylenediaminetetraacetic acid (EDTA), 0.12 part of sodium ascorbate, and 1 part of deionized water as the aqueous solution containing the reductant D were added thereto. Subsequently, 2.2 parts of allyl methacrylate as the remainder (monomer (b5)) of mixture X of step (1) presented in Table 10, 3.7 parts of methyl methacrylate and 43.5 parts of n-butyl acrylate as the monomer (b6), and 0.035 part of an aqueous solution of t-butyl hydroperoxide and 1 part of deionized water as the polymerization initiator (C) were added thereto dropwise over 45 minutes. At this time, the reaction started at the time point at which 5.5 parts of the monomer mixture was added dropwise. Hence, the urethane resin (A3) contained in the mixture X at the time at which the reaction started was 85% by mass. The internal temperature of the flask was kept at 50° C. during the dropwise addition and kept at 75° C. for 30 minutes after the dropwise addition was completed.

Subsequently, the polymer dispersion and the coating material were prepared by the same operations as in Example 1C except that the amount of the polymerization initiator (C) and the composition of the monomer mixture Y were changed as presented in Table 10 in the step (2). The coating material thus obtained was then coated on the test plate for evaluation to form a coating film, and the water resistance and solvent resistance of the coating film were evaluated. The results of the test for the coating film thus obtained are presented in Table 10.

Example 4C

The polymer dispersion was prepared by performing the same operation as in Example 1C except step (2).

In the step (2), the entire amount of the monomer mixture Y presented in Table 10 was added at once in 40 minutes after an aqueous solution containing the reductant D was added, and the polymerization initiator (C) was added in 30 minutes after the addition was completed. In addition, after confirming the peak top temperature by heat generated by the polymerization, the internal temperature of the flask was raised to 75° C. and kept at the temperature for 1.5 hours, whereby the polymer dispersion and the coating material were prepared. The coating material thus obtained was then coated on the test plate for evaluation to form a coating film, and the water resistance and solvent resistance of the coating film were evaluated. The results of the test for the coating film thus obtained are presented in Table 10.

Example 8C

The polymer dispersion and the coating material were prepared by performing the same operations as in Example 1C except that the amounts of the mixture X, the polymerization initiator (C), and an aqueous solution containing the reductant D added were changed as presented in Table 11 in the step (1) and the time for dropwise addition of the monomer mixture Y and the polymerization initiator (C) was changed to 2 hours in the step (2). The coating material thus obtained was then coated on the test plate for evaluation to form a coating film, and the water resistance and solvent resistance of the coating film were evaluated. The results of the test for the coating film thus obtained are presented in Table 11.

Example 9C

The polymer dispersion and the coating material were prepared by performing the same operations as in Example 1C except that the amounts of the mixture X, the polymerization initiator (C), and an aqueous solution containing the reductant D added were changed as presented in Table 11 in the step (1) and the time for dropwise addition of the monomer mixture Y and the polymerization initiator (C) was changed to 30 minutes in the step (2). The coating material thus obtained was then coated on the test plate for evaluation to form a coating film, and the water resistance and solvent resistance of the coating film were evaluated. The results of the test for the coating film thus obtained are presented in Table 11.

Comparative Examples 1C and 2C

The polymer dispersions and the coating material were prepared by performing the same operations as in Example 1C except that the amounts of the mixture A, the polymerization initiator (C), and an aqueous solution containing the reductant D added were changed as presented in Table 12 in the step (1). The coating material thus obtained was then coated on the test plate for evaluation to form a coating film, and the water resistance and solvent resistance of the coating film were evaluated. The results of the test for the coating film thus obtained are presented in Table 12.

Comparative Example 3C

The polymer dispersion and the coating material were prepared by performing the same operations as in Example 3C except that the time for dropwise addition of the mixture X other than the urethane resin (A3) and the polymerization initiator (C) was changed to 105 minutes in the step (1). At this time, the polymerization started immediately after the mixture X other than the urethane resin (A3) and the polymerization initiator (C) were added dropwise. Hence, the urethane resin (A3) contained in the mixture X at the time at which the reaction starts is 95% by mass or more. The coating material thus obtained was then coated on the test plate for evaluation to form a coating film, and the water resistance and solvent resistance of the coating film were evaluated. The results of the test for the coating film thus obtained are presented in Table 12.

TABLE 10

| | | | | | Example 1C | Example 2C | Example 3C | Example 4C | Example 5C | Example 6C |
|---|---|---|---|---|---|---|---|---|---|---|
| Step (1) | Mixture X | Urethane resin (A3) | I-4 | | 73.2 | 73.2 | 73.2 | 73.2 | 73.2 | 73.2 |
| | | | I-5 | | — | — | — | — | — | — |
| | | | I-6 | | — | — | — | — | — | — |
| | | | (Amount of solid matter) | | 30 | 30 | 30 | 30 | 30 | 30 |
| | | Monomer (b5) | AMA | | 2.2 | 2.2 | 2.2 | 2.2 | 2.2 | — |
| | | | TAC | | — | — | — | — | — | 2.2 |
| | | Monomer (b6) | MMA | | 3.7 | 3.7 | 3.7 | 3.7 | 3.7 | 3.7 |
| | | | nBA | | 43.5 | 43.5 | 43.5 | 43.5 | 43.5 | 43.5 |
| | | | 2EHA | | — | — | — | — | — | — |
| Step (2) | Monomer mixture Y | | MMA | | 11 | 11 | 11 | 11 | 11 | 11 |
| | | | 2EHA | | 7.4 | 7.4 | 7.4 | 7.4 | 8.1 | 8.1 |
| | | | 2HEMA | | 1 | 1 | 1 | 1 | 1 | 1 |
| | | | AMA | | 0.7 | 0.7 | 0.7 | 0.7 | — | — |
| | | | AA | | 0.5 | 0.5 | 0.5 | 0.5 | 0.5 | 0.5 |
| | Producing method | | Step (1) | | Collective | Collective | Short time dropwise addition (Added dropwise for 45 minutes) | Collective | Collective | Collective |
| | | | Step (2) | | Dropwise addition of PreEm | Dropwise addition of monomer | Dropwise addition of monomer | Collective | Dropwise addition of PreEm | Dropwise addition of PreEm |
| Content of urethane resin (A3) with respect to total mass of mixture X | | | (% by mass) | | 38 | 38 | 85 | 38 | 38 | 38 |
| Particle size of polymer Z in polymer dispersion | | | (nm) | | 234 | 230 | 223 | 233 | 223 | 243 |

TABLE 10-continued

|  |  |  | Example 1C | Example 2C | Example 3C | Example 4C | Example 5C | Example 6C |
|---|---|---|---|---|---|---|---|---|
| Evaluation result | Solvent resistance | Gloss retention (%) | A | B | C | A | A | B |
|  |  | ΔL | B | B | C | A | B | C |
|  | Water resistance (1) | Whitening | A | A | A | A | A | B |
|  | Water resistance (2) | Gloss retention (%) | B | C | C | B | A | A |
|  |  | ΔL | B | B | B | C | B | B |

TABLE 11

|  |  |  |  | Example 7C | Example 8C | Example 9C | Example 10C | Example 11C | Example 12C |
|---|---|---|---|---|---|---|---|---|---|
| Step (1) | Mixture X | Urethane resin (A3) | I-4 | 73.2 | 73.2 | 170.7 | 73.2 | 73.2 | — |
|  |  |  | I-5 | — | — | — | — | — | 100 |
|  |  |  | I-6 | — | — | — | — | — | — |
|  |  |  | (Amount of solid matter) | 30 | 30 | 70 | 30 | 30 | 30 |
|  |  | Monomer (b5) | AMA | 3.7 | 1 | 0.9 | 2.2 | 2.2 | 2.2 |
|  |  |  | TAC | — | — | — | — | — | — |
|  |  | Monomer (b6) | MMA | 3.7 | 1.5 | 1.6 | 3.7 | 3.7 | 3.7 |
|  |  |  | nBA | 42 | 18.1 | 18.6 | — | 43.5 | 43.5 |
|  |  |  | 2EHA | — | — | — | 43.5 | — | — |
| Step (2) | Monomer mixture Y |  | MMA | 11 | 28.1 | 4.7 | 11 | 11 | 11 |
|  |  |  | 2EHA | 8.1 | 18.9 | 3.2 | 7.4 | 7.9 | 7.9 |
|  |  |  | 2HEMA | 1 | 1.2 | 0.5 | 1 | 1 | 1 |
|  |  |  | AMA | — | 0.7 | 0.3 | 0.7 | 0.7 | 0.7 |
|  |  |  | AA | 0.5 | 0.5 | 0.2 | 0.5 | — | — |
|  | Producing method |  | Step (1) | Collective | Collective | Collective | Collective | Collective | Collective |
|  |  |  | Step (2) | Dropwise addition of PreEm | Dropwise addition of PreEm | Dropwise addition of PreEm | Dropwise addition of PreEm | Dropwise addition of PreEm | Dropwise addition of PreEm |
| Content of urethane resin (A3) to total mass of mixture X |  |  | (% by mass) | 38 | 59 | 77 | 38 | 38 | 38 |
| Particle size of polymer Z in polymer dispersion |  |  | (nm) | 239 | 264 | 222 | 244 | 220 | 101 |
| Evaluation result | Solvent resistance |  | Gloss retention (%) | A | C | A | A | A | A |
|  |  |  | ΔL | A | C | A | A | A | A |
|  | Water resistance (1) |  | Whitening | A | B | B | A | A | A |
|  | Water resistance (2) |  | Gloss retention (%) | A | C | A | A | C | B |
|  |  |  | ΔL | C | B | A | B | A | A |

TABLE 12

|  |  |  |  | Example 13C | Example 14C | Example 15C | Comparative Example 1C | Comparative Example 2C | Comparative Example 3C |
|---|---|---|---|---|---|---|---|---|---|
| Step (1) | Mixture X | Urethane resin (A3) | I-4 | — | — | — | 73.2 | 73.2 | 73.2 |
|  |  |  | I-5 | — | — | — | — | — | — |
|  |  |  | I-6 | 75 | 75 | 75 | — | — | — |
|  |  |  | (Amount of solid matter) | 30 | 30 | 30 | 30 | 30 | 30 |
|  |  | Monomer (b5) | AMA | 2.2 | 1.6 | 1.6 | — | — | 2.2 |
|  |  |  | TAC | — | 0.7 | 0.7 | — | — | — |
|  |  | Monomer (b6) | MMA | 3.7 | 3.7 | 3.7 | 3.7 | 3.7 | 3.7 |
|  |  |  | nBA | 43.5 | 43.4 | 43.4 | — | 45.7 | 43.5 |
|  |  |  | 2EHA | — | — | — | — | — | — |
| Step (2) | Monomer mixture Y |  | MMA | 11 | 11 | 15.8 | 11 | 11 | 11 |
|  |  |  | 2EHA | 7.9 | 7.4 | 3.3 | 8.1 | 7.4 | 7.4 |
|  |  |  | 2HEMA | 1 | 1 | 1 | 1 | 1 | 1 |
|  |  |  | AMA | 0.7 | 0.7 | — | — | 0.7 | 0.7 |
|  |  |  | AA | — | 0.5 | 0.5 | 0.5 | 0.5 | 0.5 |
|  | Producing method |  | Step (1) | Collective | Collective | Collective | Collective | Collective | Dropwise addition of monomer (Added dropwise for 105 minutes) |
|  |  |  | Step (2) | Dropwise addition of PreEm | Dropwise addition of PreEm | Dropwise addition of PreEm | Dropwise addition of PreEm | Dropwise addition of PreEm | Dropwise addition of monomer |

TABLE 12-continued

|  |  | Example 13C | Example 14C | Example 15C | Comparative Example 1C | Comparative Example 2C | Comparative Example 3C |
|---|---|---|---|---|---|---|---|
| Content of urethane resin (A3) with respect to total mass of mixture X | (% by mass) | 38 | 38 | 38 | 38 | 38 | >95 |
| Particle size of polymer Z in polymer dispersion | (nm) | 197 | 202 | 220 | 222 | 224 | 251 |
| Evaluation result Solvent resistance | Gloss retention (%) | A | A | A | D (Dissolved) | D (Dissolved) | D (Peeled off) |
|  | ΔL | A | A | A |  |  |  |
| Water resistance (1) | Whitening | A | A | A | C | C | A |
| Water resistance (2) | Gloss retention (%) | C | B | C | A | A | D (Cracked) |
|  | ΔL | B | B | A | A | A |  |

However, the abbreviations in Tables 10 to 12 represent the following compounds.

<Mixture X>
(Urethane Resin (A3))
I-4: a polycarbonate-based urethane polymer (trade name: F-8082D manufactured by DKS Co., Ltd., solid matter: 41%)
I-5: a polyether-based urethane polymer (trade name: PERMARIN UA-150 manufactured by Sanyo Chemical Industries, Ltd., solid matter: 30%)
I-6: a polyester-based urethane polymer (trade name: IMPRANIL LP RSC 3040 manufactured by Sumika Bayer Urethane Co., Ltd., solid matter: 40%)

In addition, the abbreviations other than those described above represent the same compounds as in Tables 1 to 9.

In addition, the terms "collective", "dropwise addition of PreEm", and "dropwise addition of monomer" in the producing method in Tables 10 to 12 mean the following methods.

Collective: a method in which the entire amount of the mixture X other than the urethane resin (A3) or the monomer mixture Y is added at once.

Dropwise addition of PreEm: a method in which a prepolymer dispersion obtained by emulsifying and dispersing the respective components of the monomer mixture Y, the emulsifier, and deionized water in advance Dropwise addition of monomer: a method in which the mixture X other than the urethane resin (A3) or the monomer mixture Y is added dropwise. Here the emulsifier may be added thereto.

From the results of Tables 10 to 12, the coating films using the coating materials of Examples 1C to 15C according to the third embodiment of the invention were equipped with both excellent solvent resistance and water resistance.

On the other hand, in Comparative Examples 1C and 2C, the monomer (b5) having two or more radically polymerizable groups is not contained in the mixture X used in the step (1) and thus the solvent resistance and water resistance (1) of the coating film thus obtained were inferior.

In Comparative Example 3C, the urethane resin (A3) contained in the mixture X was more than 95% by mass in the step (1) and thus the solvent resistance and water resistance (2) of the coating film thus obtained were inferior.

INDUSTRIAL APPLICABILITY

The polymer dispersions according to the first to third embodiments of the invention exhibit excellent polymerization stability at the time of production, and the coating materials containing the polymer dispersions exhibit excellent paint viscosity characteristics and storage stability. Moreover, the coating films coated with the coating materials containing the polymer dispersions according to the first to the third embodiments of the invention exert excellent water resistance and solvent resistance. The dry coating film obtained even under the conditions in which the evaporation of water and the solvent and the fusion of the particles are insufficient particularly such as a drying condition of a low temperature and a short time exhibits excellent water resistance and solvent resistance. Consequently, the coating material of the invention can be used for various coating applications including the skeleton protection of and imparting of design to the outer plate of the body of a motor vehicle such as a passenger car, a truck, a motorcycle, and a bus, a motor vehicle part, a building, a civil engineering structure, and the like, and thus it is significantly industrially useful.

The invention claimed is:

1. Polymer particles comprising a urethane resin (A1) and an acrylic polymer (B1) in the same particle, wherein a gel fraction of the polymer particles measured using N,N-dimethylformamide (DMF) as a solvent is 10% or more, and
   wherein the acrylic polymer (B1) comprises a repeating unit derived from an acid group-containing radically polymerizable monomer (b2-1) and a proportion of the repeating unit derived from the acid group-containing radically polymerizable monomer (b2-1) is from 0.008 to 3.4% by mass with respect to a total mass of the urethane resin (A1) and the acrylic polymer (B1).

2. The polymer particles according to claim 1, wherein the urethane resin (A1) comprises a urethane resin (A1-1) having a sulfonic acid group.

3. The polymer particles according to claim 1, wherein the acrylic polymer (B1) comprises a repeating unit derived from a monomer (b1) having two or more radically polymerizable groups and a proportion of the repeating unit derived from the monomer (b1) having two or more radically polymerizable groups is from 0.01 to 10% by mass with respect to a total mass of the urethane resin (A1) and the acrylic polymer (B1).

4. A polymer dispersion comprising the polymer particles according to claim 1.

5. Polymer particles comprising a urethane resin (A2) having a sulfonic acid group and an acrylic polymer (B2) in the same particle, wherein a surface acid value of the polymer particles measured by potentiometric titration is from 0.1 to 19 mg KOH/g, and
   wherein the acrylic polymer (B2) comprises a repeating unit derived from an acid group-containing radically polymerizable monomer (b4-1) and a proportion of the repeating unit derived from the acid group-containing radically polymerizable monomer (b4-1) is from 0.008 to 3.4% by mass with respect to a total mass of the urethane resin (A2) and the acrylic polymer (B2).

6. The polymer particles according to claim 5, wherein the acrylic polymer (B2) comprises a repeating unit derived from a monomer (b3) having two or more radically polymerizable groups.

7. The polymer particles according to claim 6, wherein a proportion of the repeating unit derived from the monomer (b3) having two or more radically polymerizable groups is from 0.05 to 10% by mass with respect to a total mass of the urethane resin (A2) and the acrylic polymer (B2).

8. A polymer dispersion comprising the polymer particles according to claim 5.

9. A coating material comprising the polymer dispersion according to claim 4.

10. A coated article coated with the coating material according to claim 9.

11. The coated article according to claim 10, wherein a gloss retention of the coating film after being immersed in solvent naphtha for 30 seconds is 60% or more.

* * * * *